United States Patent
Akkarakaran et al.

(10) Patent No.: US 11,089,577 B2
(45) Date of Patent: Aug. 10, 2021

(54) CHANNELIZATION FOR UPLINK TRANSMISSIONS

(71) Applicant: Qualcomm Incorporated, San Diego, CA (US)

(72) Inventors: Sony Akkarakaran, Poway, CA (US); Tao Luo, San Diego, CA (US); Xiaoxia Zhang, San Diego, CA (US); Zhifei Fan, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/453,864

(22) Filed: Jun. 26, 2019

(65) Prior Publication Data
US 2019/0320433 A1 Oct. 17, 2019

Related U.S. Application Data

(63) Continuation of application No. 15/712,584, filed on Sep. 22, 2017, now Pat. No. 10,356,764.

(Continued)

(51) Int. Cl.
*H04W 72/04* (2009.01)
*H04L 5/00* (2006.01)
(Continued)

(52) U.S. Cl.
CPC .......... *H04W 72/0413* (2013.01); *H04L 1/00* (2013.01); *H04L 5/0053* (2013.01); *H04W 72/0446* (2013.01); *H04W 72/1284* (2013.01); *H04L 1/0026* (2013.01); *H04L 1/16* (2013.01); *H04L 1/1861* (2013.01); *H04L 5/0007* (2013.01);
(Continued)

(58) Field of Classification Search
CPC ..... H04L 67/22; H04L 65/1069; H04L 67/42; G06F 3/0484; G06F 3/0488; G06F 16/958
See application file for complete search history.

(56) References Cited

U.S. PATENT DOCUMENTS

| 8,705,477 B2 | 4/2014 | Baldemair et al. |
| 8,824,373 B2 | 9/2014 | Seo et al. |
(Continued)

FOREIGN PATENT DOCUMENTS

WO     WO2010148319 A    12/2010

OTHER PUBLICATIONS

International Search Report and Written Opinion—PCT/US2017/053161—ISA/EPO—Dec. 6, 2017.

*Primary Examiner* — Hashim S Bhatti
(74) *Attorney, Agent, or Firm* — Holland & Hart LLP

(57) ABSTRACT

A method of wireless communication may include transmitting an uplink slot with a first control region, a second control region, and (e.g., optionally) a data region. Each region may include time resources and frequency resources. Transmitting the uplink slot may include transmitting the first control region in an earlier part of the uplink slot and transmitting the second control region (e.g., and the data region) in a later part of the uplink slot. The first control region may include time-critical control information and the second control region may include non-time-critical control information. A receiver receiving the uplink slot may receive the first control region before receiving the data region and the second control region.

26 Claims, 19 Drawing Sheets

Related U.S. Application Data

(60) Provisional application No. 62/402,677, filed on Sep. 30, 2016.

(51) Int. Cl.

| | | |
|---|---|---|
| *H04W 72/12* | (2009.01) | |
| *H04L 1/00* | (2006.01) | |
| *H04W 76/27* | (2018.01) | |
| *H04L 1/16* | (2006.01) | |
| *H04L 1/18* | (2006.01) | |

(52) U.S. Cl.
CPC .......... *H04L 5/0023* (2013.01); *H04L 5/0055* (2013.01); *H04L 5/0057* (2013.01); *H04W 72/1242* (2013.01); *H04W 72/1268* (2013.01); *H04W 76/27* (2018.02)

(56) References Cited

U.S. PATENT DOCUMENTS

| | | | |
|---|---|---|---|
| 9,071,412 B2* | 6/2015 | Tiirola | H04B 7/0404 |
| 9,112,663 B2* | 8/2015 | Nakashima | H04L 5/0057 |
| 9,253,766 B2 | 2/2016 | Yang et al. | |
| 9,288,795 B2 | 3/2016 | Lee et al. | |
| 9,357,537 B2 | 5/2016 | Hwang et al. | |
| 9,655,087 B2* | 5/2017 | Park | H04L 1/0038 |
| 9,755,803 B2* | 9/2017 | Parkvall | H04L 5/0053 |
| 2004/0160936 A1* | 8/2004 | Liu | H04W 72/1268 |
| | | | 370/348 |
| 2011/0176498 A1* | 7/2011 | Montojo | H04W 72/048 |
| | | | 370/329 |
| 2011/0211551 A1* | 9/2011 | Parkvall | H04L 5/0053 |
| | | | 370/330 |
| 2012/0044893 A1* | 2/2012 | Suzuki | H04L 1/1671 |
| | | | 370/329 |
| 2012/0252474 A1* | 10/2012 | Tiirola | H04L 5/0053 |
| | | | 455/450 |
| 2013/0083766 A1* | 4/2013 | Chung | H04W 72/0413 |
| | | | 370/329 |
| 2013/0288738 A1* | 10/2013 | Takeda | H04L 1/1854 |
| | | | 455/522 |
| 2014/0003369 A1 | 1/2014 | Josiam et al. | |
| 2015/0043458 A1* | 2/2015 | Seo | H04L 1/1861 |
| | | | 370/329 |
| 2015/0110029 A1* | 4/2015 | Hwang | H04L 1/0031 |
| | | | 370/329 |
| 2015/0131565 A1* | 5/2015 | Nakashima | H04L 1/0026 |
| | | | 370/329 |
| 2015/0131626 A1* | 5/2015 | Tsai | H04W 72/0446 |
| | | | 370/336 |
| 2016/0029371 A1* | 1/2016 | Yang | H04W 72/1268 |
| | | | 370/329 |
| 2016/0150490 A1* | 5/2016 | Ouchi | H04W 52/16 |
| | | | 455/522 |
| 2017/0141884 A1* | 5/2017 | Li | H04L 5/0055 |
| 2017/0156152 A1* | 6/2017 | Nazar | H04W 72/0413 |
| 2017/0331577 A1* | 11/2017 | Parkvall | H04L 5/1469 |
| 2018/0098317 A1 | 4/2018 | Akkarakaran et al. | |

* cited by examiner

Transmit an uplink slot comprising a first control region and a second control region, the first control region including first time resources and first frequency resources and the second control region including second time resources and second frequency resources, where transmitting the uplink slot comprises transmitting the first control region in an earlier portion of the uplink slot and transmitting the second control region in a later portion of the uplink slot ⟵ 1605

1805 — Receive an uplink slot comprising a first control region and a second control region, the first control region including first time resources and first frequency resources and the second control region including second time resources and second frequency resources, where receiving the uplink slot comprises receiving the first control region in an earlier portion of the uplink slot and receiving the second control region in a later portion of the uplink slot

CHANNELIZATION FOR UPLINK TRANSMISSIONS

CROSS REFERENCES

The present Application for Patent is a Continuation of U.S. patent application Ser. No. 15/712,584 by Akkarakaran, et al., entitled "Channelization For Uplink Transmissions" filed Sep. 22, 2017, which claims priority to U.S. Provisional Patent Application No. 62/402,677 by Akkarakaran, et al., entitled "Channelization For Uplink Transmissions," filed Sep. 30, 2016, assigned to the assignee hereof, and which is expressly incorporated by reference herein.

BACKGROUND

The following relates generally to wireless communication, and more specifically to configuring resources for uplink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipments (UEs).

In some examples, a wireless multiple-access communication system may include a number of base stations, each simultaneously supporting communication for multiple communication devices, otherwise known as UEs. In a LTE or LTE-Advanced (LTE-A) network, a set of one or more base stations may define an eNodeB (eNB). In other examples (e.g., in a new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink channels (e.g., for transmissions from a base station to a UE) and uplink channels (e.g., for transmissions from a UE to a base station).

An uplink transmission may include data as well as control information (e.g., a rank indicator (RI), a sounding reference signal (SRS), etc.). In some wireless communications systems, the actual data is multiplexed together with the control information within an uplink slot such that a receiver must decode a majority or all of the slot before being able to decode the control information. Multiplexing and transmitting data in this way may increase decoding latency or otherwise reduce efficiency in a wireless communications system.

SUMMARY

Methods, systems, and apparatuses for configuring and transmitting uplink transmissions are described. A device, such as a UE, may transmit an uplink slot having different regions of information or data such that certain regions are transmitted before other regions. In some cases, a slot may alternatively be referred to as a subframe. For example, a UE may transmit the uplink slot such that one or more regions (e.g., a first control region) is transmitted before one or more other regions (e.g., another control or a data region). Likewise, a receiver, such as a base station, receiving the uplink slot may receive one or more regions (e.g., the first control region) before one or more other regions (e.g., the other control region or the data region). In some cases, the control region transmitted and received first contains time-critical control information. Transmitting an uplink slot in this way may facilitate the reception and decoding of time-critical control information before the entire slot (or the nearly the entire slot) is received and decoded, thereby reducing latency associated with decoding and responding to the time-critical control information.

A method of wireless communication is described. The method may include transmitting an uplink slot comprising a first control region and a second control region, the first control region including first time resources and first frequency resources and the second control region including second time resources and second frequency resources, wherein transmitting the uplink slot comprises transmitting the first control region in an earlier portion of the uplink slot and transmitting the second control region in a later portion of the uplink slot.

An apparatus for wireless communication is described. The apparatus may include means for transmitting an uplink slot comprising a first control region and a second control region, the first control region including first time resources and first frequency resources and the second control region including second time resources and second frequency resources, wherein transmitting the uplink slot comprises transmitting the first control region in an earlier portion of the uplink slot and transmitting the second control region in a later portion of the uplink slot.

Another apparatus for wireless communication is described. The apparatus may include a processor, memory in electronic communication with the processor, and instructions stored in the memory. The instructions may be operable to cause the processor to transmit an uplink slot comprising a first control region and a second control region, the first control region including first time resources and first frequency resources and the second control region including second time resources and second frequency resources, wherein transmitting the uplink slot comprises transmitting the first control region in an earlier portion of the uplink slot and transmitting the second control region in a later portion of the uplink slot.

A non-transitory computer readable medium for wireless communication is described. The non-transitory computer-readable medium may include instructions operable to cause a processor to transmit an uplink slot comprising a first control region and a second control region, the first control region including first time resources and first frequency resources and the second control region including second time resources and second frequency resources, wherein transmitting the uplink slot comprises transmitting the first control region in an earlier portion of the uplink slot and transmitting the second control region in a later portion of the uplink slot.

In some examples of the method, apparatus, and non-transitory computer-readable medium described above, the later portion of the uplink slot further comprises a data region, the data region including third time resources and third frequency resources.

In some examples of the method, apparatus, and non-transitory computer-readable medium described above, the transmitting the uplink slot further comprises transmitting an entirety of the first control region before transmitting an entirety of the data region and an entirety of the second control region.

In some examples of the method, apparatus, and non-transitory computer-readable medium described above, the first control region, the second control region, and the data region are scheduled independently from one another.

In some examples of the method, apparatus, and non-transitory computer-readable medium described above, the second control region occupies a subset of the later portion of the uplink slot and the data region occupies a remainder of the later portion of the uplink slot.

In some examples of the method, apparatus, and non-transitory computer-readable medium described above, the first frequency resources, the second frequency resources, or both comprise every assigned frequency resource of the uplink slot.

In some examples of the method, apparatus, and non-transitory computer-readable medium described above, the first frequency resources, the second frequency resources, or both comprise a subset of the assigned frequency resources of the uplink slot.

In some examples of the method, apparatus, and non-transitory computer-readable medium described above, the first control region, or the second control region, or a combination thereof span every time resource of the uplink slot.

In some examples of the method, apparatus, and non-transitory computer-readable medium described above, the first control region comprises time-critical control information.

In some examples of the method, apparatus, and non-transitory computer-readable medium described above, the time-critical control information comprises a positive acknowledgement (ACK), a negative acknowledgement (NACK), directional communication information, a channel quality indication (CQI), a precoding matrix indicator (PMI), a RI, a scheduling information indicator (SI), a beam strength measurement, a sounding reference signal (SRS), or a combination thereof.

In some examples of the method, apparatus, and non-transitory computer-readable medium described above, the second control region comprises non-time-critical control information.

In some examples of the method, apparatus, and non-transitory computer-readable medium described above, the non-time-critical control information comprises a positive ACK, NACK, directional communication information, CQI, PMI, RI, SI, a beam signal measurement, SRS, or a combination thereof.

Some examples of the method, apparatus, and non-transitory computer-readable medium described above may further include processes, features, means, or instructions for receiving control signaling indicating the first time resources, the first frequency resources, the second time resources, the second frequency resources, or any combination thereof.

In some examples of the method, apparatus, and non-transitory computer-readable medium described above, the control signaling indicates at least one of frequency-first modulation or time-first modulation for the first control region, the second control region, or the data region.

In some examples of the method, apparatus, and non-transitory computer-readable medium described above, the control signaling comprises physical downlink control channel (PDCCH) signaling or radio resource control (RRC) signaling.

In some examples of the method, apparatus, and non-transitory computer-readable medium described above, a location of the first control region within the uplink slot may be based at least in part on a type of control information in the first control region.

In some examples of the method, apparatus, and non-transitory computer-readable medium described above, a location of the first control region within the uplink slot may be based at least in part on a location of one or more demodulation reference signals (DMRS) within the uplink slot.

In some examples of the method, apparatus, and non-transitory computer-readable medium described above, the uplink slot comprises a first gap between a first end of the uplink slot and a first end of the first control region, or a second gap between a second end of the uplink slot and a first end of the second control region, or both, wherein the first gap or the second gap, or both, comprises at least one time resource.

In some examples of the method, apparatus, and non-transitory computer-readable medium described above, the time resources comprise orthogonal frequency division multiplexing (OFDM) symbols or s discrete Fourier transform-spread-OFDM (DFT-s-OFDM) symbols.

In some examples of the method, apparatus, and non-transitory computer-readable medium described above, the frequency resources comprise frequency tones.

A method of wireless communication is described. The method may include receiving an uplink slot comprising a first control region and a second control region, the first control region including first time resources and first frequency resources and the second control region including second time resources and second frequency resources, wherein receiving the uplink slot comprises receiving the first control region in an earlier portion of the uplink slot and receiving the second control region in a later portion of the uplink slot.

An apparatus for wireless communication is described. The apparatus may include means for receiving an uplink slot comprising a first control region and a second control region, the first control region including first time resources and first frequency resources and the second control region including second time resources and second frequency resources, wherein receiving the uplink slot comprises receiving the first control region in an earlier portion of the uplink slot and receiving the second control region in a later portion of the uplink slot.

Another apparatus for wireless communication is described. The apparatus may include a processor, memory in electronic communication with the processor, and instructions stored in the memory. The instructions may be operable to cause the processor to receive an uplink slot comprising a first control region and a second control region, the first control region including first time resources and first frequency resources and the second control region including second time resources and second frequency resources, wherein receiving the uplink slot comprises receiving the first control region in an earlier portion of the uplink slot and receiving the second control region in a later portion of the uplink slot.

A non-transitory computer readable medium for wireless communication is described. The non-transitory computer-readable medium may include instructions operable to cause a processor to receive an uplink slot comprising a first control region and a second control region, the first control region including first time resources and first frequency resources and the second control region including second time resources and second frequency resources, wherein receiving the uplink slot comprises receiving the first control region in an earlier portion of the uplink slot and receiving the second control region in a later portion of the uplink slot.

In some examples of the method, apparatus, and non-transitory computer-readable medium described above, the later portion of the uplink slot further comprises a data region, the data region including third time resources and third frequency resources.

In some examples of the method, apparatus, and non-transitory computer-readable medium described above, the transmitting the uplink slot further comprises transmitting an entirety of the first control region before transmitting an entirety of the data region and an entirety of the second control region.

In some examples of the method, apparatus, and non-transitory computer-readable medium described above, the first control region, the second control region, and the data region are scheduled independently from one another.

In some examples of the method, apparatus, and non-transitory computer-readable medium described above, the second control region occupies a subset of the later portion of the uplink slot and the data region occupies a remainder of the later portion of the uplink slot.

In some examples of the method, apparatus, and non-transitory computer-readable medium described above, the first frequency resources, the second frequency resources, or both comprise every assigned frequency resource of the uplink slot.

In some examples of the method, apparatus, and non-transitory computer-readable medium described above, the first frequency resources, the second frequency resources, or both comprise a subset of the assigned frequency resources of the uplink slot.

In some examples of the method, apparatus, and non-transitory computer-readable medium described above, the first control region, or the second control region, or a combination thereof span every time resource of the uplink slot.

In some examples of the method, apparatus, and non-transitory computer-readable medium described above, the first control region comprises time-critical control information.

In some examples of the method, apparatus, and non-transitory computer-readable medium described above, the time-critical control information comprises an ACK, a NACK, directional communication information, CQI, PMI, RI, SI, a beam strength measurement, SRS, or a combination thereof.

In some examples of the method, apparatus, and non-transitory computer-readable medium described above, the second control region comprises non-time-critical control information.

In some examples of the method, apparatus, and non-transitory computer-readable medium described above, the non-time-critical control information comprises a positive ACK, NACK, directional communication information, CQI, PMI, RI, SI, a beam signal measurement, SRS, or a combination thereof.

Some examples of the method, apparatus, and non-transitory computer-readable medium described above may further include processes, features, means, or instructions for transmitting control signaling indicating first time resources, first frequency resources, second time resources, second frequency resources, or any combination thereof.

In some examples of the method, apparatus, and non-transitory computer-readable medium described above, the control signaling indicates at least one of frequency-first modulation or time-first modulation for the first control region, the second control region, or the data region.

In some examples of the method, apparatus, and non-transitory computer-readable medium described above, the control signaling comprises PDCCH signaling or RRC signaling.

In some examples of the method, apparatus, and non-transitory computer-readable medium described above, a location of the first control region within the uplink slot may be based at least in part on a type of control information in the first control region.

In some examples of the method, apparatus, and non-transitory computer-readable medium described above, a location of the first control region within the uplink slot may be based at least in part on a location of one or more DMRS within the uplink slot.

In some examples of the method, apparatus, and non-transitory computer-readable medium described above, the uplink slot comprises a first gap between a first end of the uplink slot and a first end of the first control region, or a second gap between a second end of the uplink slot and a first end of the second control region, or both, wherein the first gap or the second gap, or both, comprises at least one time resource.

In some examples of the method, apparatus, and non-transitory computer-readable medium described above, the time resources comprise OFDM symbols or DFT-s-OFDM symbols.

In some examples of the method, apparatus, and non-transitory computer-readable medium described above, the frequency resources comprise frequency tones.

BRIEF DESCRIPTION OF THE DRAWINGS

FIGS. 16 through 19 illustrate methods for channelization for uplink transmissions in accordance with aspects of the present disclosure.

DETAILED DESCRIPTION

According to aspects of the present disclosure, a UE may transmit an uplink message to a base station such that certain regions of information or data within the uplink message are transmitted before other regions. The base station receiving the uplink message may likewise receive and/or decode the regions that were transmitted first before receiving and/or decoding the other regions. In some examples, an uplink slot includes a region containing time-critical control information and a region containing non-time-critical control information. In some cases, the uplink slot further includes a region containing data. The UE may transmit the uplink message such that the time-critical control region is transmitted in an earlier portion of the uplink slot and the non-time-critical control region (e.g., and the data region) is transmitted in a later portion of the uplink slot.

In some examples, the UE may transmit the uplink message such that an entirety of the time-critical control information is transmitted before an entirety of the data region and/or an entirety of the non-time-critical control information. Specifically, in some examples, the UE may transmit the uplink message such that the last part of the time-critical control information is transmitted before the last part of the data and/or non-time critical control information is transmitted. Such a transmission scheme may occur even when some parts of the data or the non-time-critical control information are transmitted before some parts of the time-critical control information (e.g., such that uplink control information may be configurable as compared to data). A base station receiving the uplink message may receive and decode the time-critical control information before receiving and/or decoding the non-time-critical control information or the data.

An uplink slot containing separate control regions (e.g., with or without a separate data region) may be populated according to a frequency-first scheme. For example, within each region of the uplink slot, the modulation symbols may be arranged along the frequency and time resources such that a receiver decoding the modulation symbols may decode a particular region of resources before having to decode a majority or all of the slot. Arranging the modulation symbols using the frequency-first scheme may facilitate early decoding of data within the slot or within each region.

Aspects of the disclosure are initially described in the context of a wireless communications system. For example, wireless communications systems supporting the configuration and transmission of an uplink message containing separate control regions and data regions is described. Aspects of the disclosure are further illustrated by and described with reference to apparatus diagrams, system diagrams, and flowcharts that relate to channelization for uplink transmissions.

Figure 1:
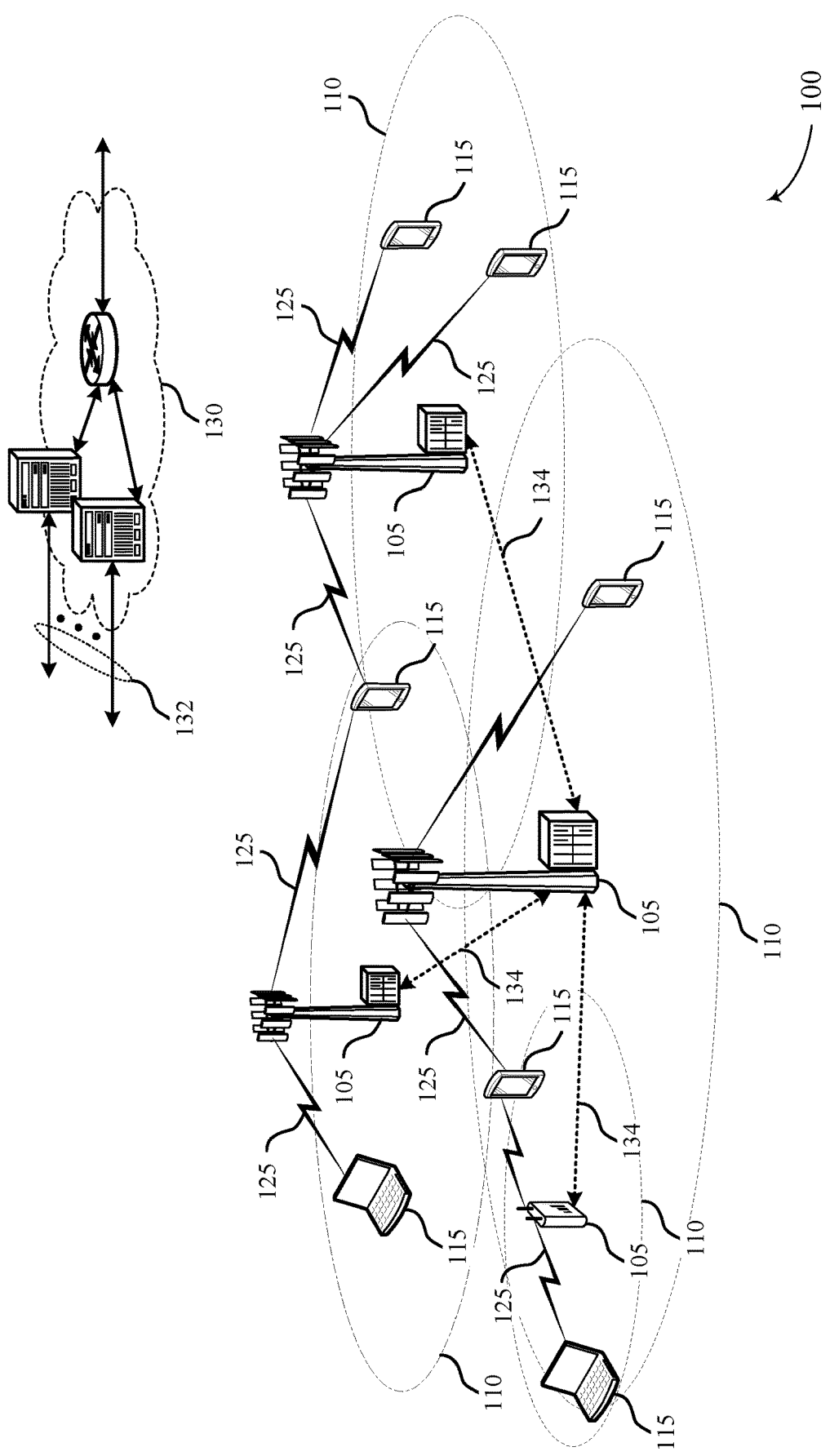
FIG. 1 illustrates an example of a system for wireless communication that supports channelization for uplink transmissions in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. The wireless communications system 100 may support configuring an uplink message from UE 115 to base station 105 that contains one or more control regions and a data region. According to some aspects, a UE 115 may transmit, and the base station 105 may receive, an uplink message such that certain regions within the uplink message (e.g., a region containing time-critical control information) are received and decoded before other regions (e.g., a region containing non-time-critical control information).

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may provide communication coverage for a respective geographic coverage area 110. The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or New Radio (NR) network in which different types of base stations 105 provide coverage for various geographic coverage areas 110.

Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD), or a combination of both.

Wireless communications system 100 may operate in an ultra-high frequency (UHF) region using frequency bands from 300 MHz to 3 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. Wireless communications system 100 may also operate in a super high frequency (SHF) region using frequency bands from 3 GHz to 30 GHz, otherwise known as the centimeter band. In some cases, wireless communication system 100 may also utilize extremely high frequency (EHF) portions of the spectrum (e.g., from 30 GHz to 300 GHz), also known as the millimeter band. Systems that use this region may be referred to as millimeter wave (mmW) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

Wireless communications system 100 may support millimeter wave (mmW) communications between UEs 115 and base stations 105. Devices operating in mmW, SHF, or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals. Multiple-input multiple-output (MIMO) wireless systems use a transmission scheme between a transmitter (e.g., a base station 105) and a receiver (e.g., a UE 115), where both transmitter and receiver are equipped with multiple antennas.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Multiple-input, multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving synchronization signals (e.g., or other reference signals). Each of these beams may be referred to as a receive beam in aspects of the present disclosure. In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

The wireless communications system 100 may support the use of uplink reference signals transmitted from a UE 115 to a base station 105. For example, a DMRS may be transmitted in an uplink message and may be used by a base station 105 for channel estimation and to assist in the demodulation of uplink channels. In some examples, DMRS may be mapped onto one or more hops of an uplink slot, where a hop may refer to a set of OFDM symbols in which the same frequency tones (e.g., subcarriers) are used for transmission; different hops may in some cases use different frequency tones. For example, each hop of an uplink slot may contain a DMRS transmission.

Wireless communications system 100 may support different signal modulation techniques for the uplink and downlink transmissions (e.g., based on power limitations of a UE 115). For example, wireless communications system 100 may use OFDM for downlink transmissions, and DFT-s-OFDM for uplink transmissions. In wireless systems operating in the mmW spectrum (e.g., or other similar bands), OFDM may be employed for UL transmissions depending on power limitations of the UE.

Figure 3:
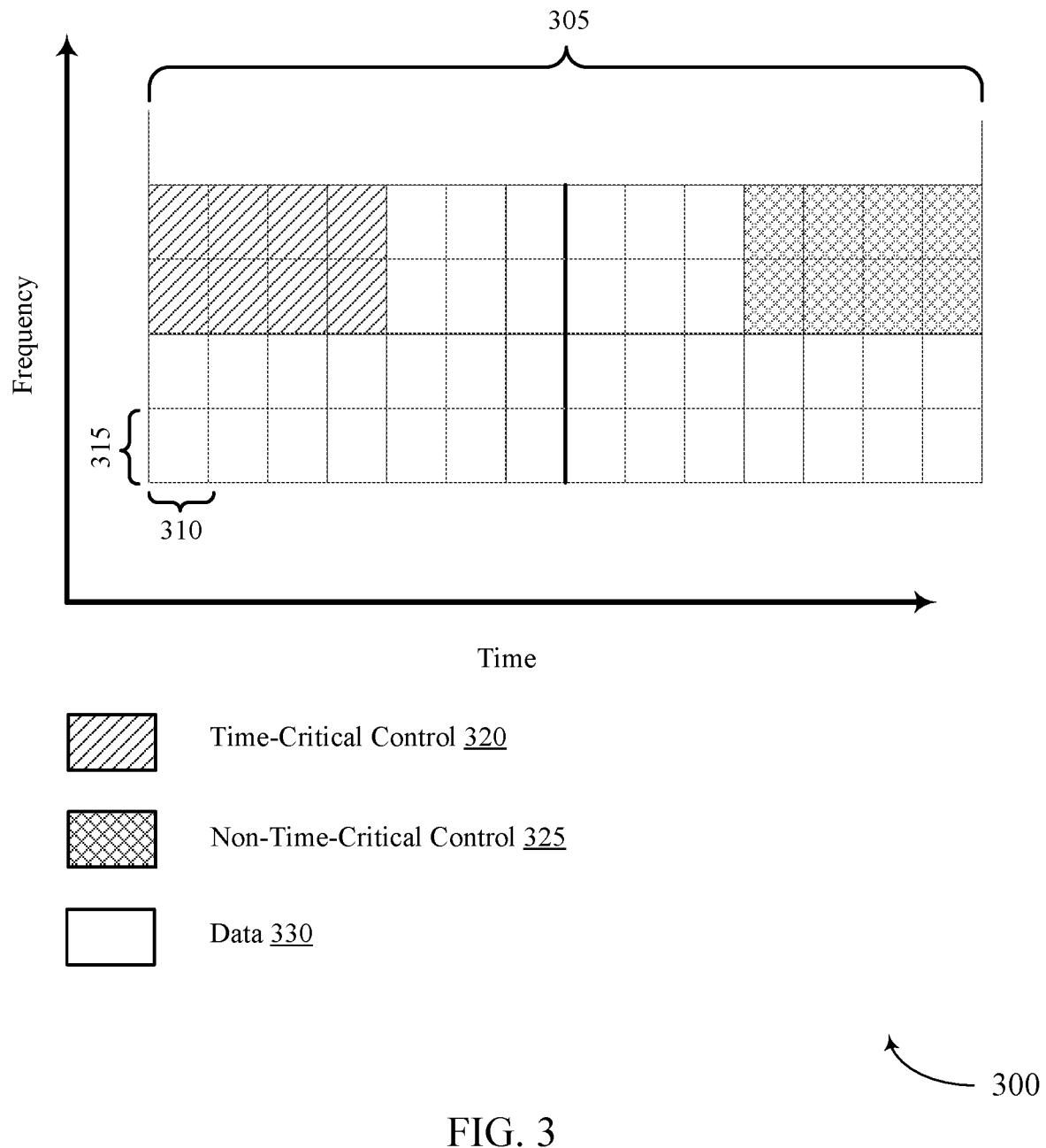
FIG. 3 illustrates an example of a wireless communications message from a device that supports channelization for uplink transmissions in accordance with aspects of the present disclosure.

In some cases, an uplink transmission configured for DFT-s-OFDM may contain control information and data interleaved together. For example, an uplink slot of a physical uplink shared channel (PUSCH) may contain uplink control information (UCI) interleaved with the actual data to be transmitted. In some cases, the data and control information are interleaved using a scheme such that a majority or all of the slot is decoded before the control information is decoded. The interleaving procedure may, for example, include populating a RI first. In some cases, populating the RI includes mapping modulation symbols within the slot along the time dimension first (e.g., row-wise from the perspective of a time-frequency grid as illustrated in FIG. 3) and then mapping modulation symbols along the frequency dimension (e.g., column-wise from the perspective of a time-frequency grid). Representing a slot as a time-frequency grid, this RI populating may include beginning at the bottom left of the grid, progressing forward in the time dimension along a particular frequency resource (i.e., along a particular row), moving up along the frequency dimension (i.e., to another row), and then progressing backwards in the time dimension at a higher frequency resource than before (e.g., creating a zig-zag pattern). This type of resource mapping may be referred to as a time-first scheme.

After the RI is populated, the CQI/PMI and the data (e.g., shared channel (SCH) data) may be populated in a similar row-wise fashion, starting at the top-left of the time-frequency grid and progressing forward in the time dimension and down in the frequency dimension. Other control information such as ACK and/or NACK symbols may be populated similarly to the RI. In cases where an ACK/NACK symbol overlaps with a SCH symbol, the ACK/NACK symbol may replace (e.g., puncture) the SCH symbol. In some cases, ACK/NACK symbols may be populated near the DMRS symbols within the slot. Because the DMRS symbols provide an indication of the channel quality for those particular time and frequency resources, symbols near those time and frequency resources may be received and decoded with a higher level of accuracy than if the symbols were farther away in time or frequency.

In some examples, as described in the present disclosure, instead of populating an uplink slot such that all or most of the slot is decoded before certain data within the slot can be decoded, an uplink slot may be divided into regions of data and configured such that a UE 115 transmits certain regions before other regions. In this way, a base station 105 may receive and/or decode certain regions (e.g., without having to decode another region or the entire slot). In some cases, an uplink slot may be divided into two or more regions: a time-critical control region, a non-time-critical control region, and (e.g., optionally) a data region. The data region may contain the actual data to be transmitted (e.g., payload). In some alternative cases, an uplink transmission may contain one control region and a data region, just a data region, etc. The use of multiple control regions may in some cases be enabled (e.g., configured) and/or disabled using control signaling, as described further below.

Figure 2:
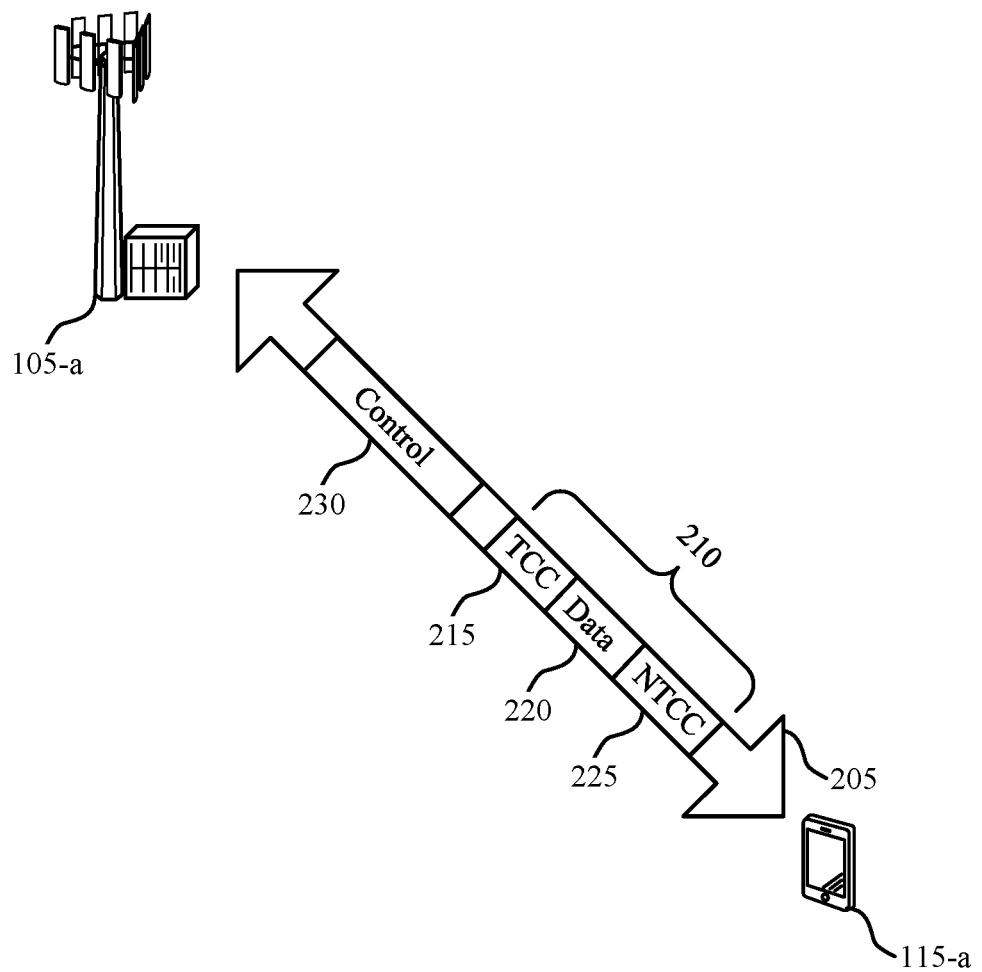
FIG. 2 illustrates an example of a system for wireless communication that supports channelization for uplink transmissions in accordance with aspects of the present disclosure.

FIG. 2 illustrates an example of a wireless communication system 200 for channelization of uplink transmissions in accordance with aspects of the present disclosure. The wireless communication system 200 may include a UE 115-a and a base station 105-a, which may be examples of the UE 115 and base station 105 described with reference to FIG. 1. Base station 105-a and UE 115-a may send and receive messages over a communication link 205, for example using an uplink slot 210. The uplink slot 210 may be divided into separate regions containing control information and data. In some examples, the uplink slot 210 is divided into a time-critical control region 215, a data region 220, and non-time-critical control region 225. The size and location of these regions within the uplink slot 210 are for illustrative purposes only, and as discussed below, may be arranged and sized in accordance with various aspects of the disclosure. Additionally, in some cases one or more of the regions may be omitted for a given uplink slot 210 (e.g., such that uplink slot 210 may in some cases contain time-critical control region 215 and non-time critical control region 225 but not data region 220).

The time-critical control region 215 may contain control information that is more time sensitive than the data itself or other less time sensitive control information. For example, feedback information regarding a previous transmission (e.g., ACK/NACK control information) may be considered time-critical because such information may be used by the base station 105-a to take some other action that is independent from the rest of the information in the uplink slot 210. In some cases, the base station 105-a may receive or decode the time-critical control region 215 before receiving or decoding the remainder of the uplink slot 210 (e.g., which may be referred to as early decoding). Early decoding the time-critical control information within the time-critical control region 215 may allow the base station 105-a to schedule the UE 115-a with resources based on the time-critical control information (e.g., without having to wait to decode the remainder of the uplink slot 210). Although ACK/NACK is provided as an example of time-critical control information, it should be appreciated that other types of control information may be considered time-critical. In some cases, control information related to the directionality of transmission and reception of data in the context of beam forming (e.g., a beam strength measurement in mmW communication systems) may be considered time-critical. Other examples may include any type of control information that would be beneficial to decode before decoding other data within the slot or the slot itself. In some cases, RI, CQI, PMI, SRS, or a SI may be considered time-critical control information.

The non-time-critical control region 225 may contain control information that is less time sensitive than the information in the time-critical control region 215. For example, non-time-critical control information may include RI, CQI, PMI, SI, ACK/NACK, or any combination thereof. Whether a particular type of control information is considered time-critical or not may be statically pre-configured, may be semi-statically or dynamically configured by the base station 105-a or some other network entity (e.g., through downlink control signaling), or may be determined (e.g., autonomously) by the UE 115-a. Furthermore, whether control information is considered time-critical may change throughout the duration of a communication session (e.g., may change from one uplink slot 210 to the next).

In some examples, the UE 115-a may interleave or otherwise populate the uplink slot 210 such that certain regions, as discussed above, are transmitted and received before others. A region of uplink slot 210 may include time and frequency resources and may be divided into time resources (e.g., symbols, such as OFDM or DFT-s-OFDM symbols) and frequency resources (e.g., frequency tones or subcarriers). In each region, the modulation symbols may be populated using a frequency-first scheme instead of a time-first scheme. Frequency-first population may refer to how the symbols of data are spread or grouped across the time and frequency resources within uplink slot 210, which may affect the order in which these symbols are received or decoded. For example, in a frequency-first scheme, symbols may be arranged along the frequency dimension for a given time increment before other time resources are utilized. Frequency-first population may group certain types of information into regions (e.g., time-critical control information or data) within uplink slot 210, and may also arrange certain data or information within a particular region according to a certain order (e.g., more important or time sensitive data towards the beginning of a region).

Frequency-first population may include populating a contiguous band of frequency resources (e.g., not skipping any frequency resources) with a particular type of information (e.g., control information or data) within a given time increment. In other cases, the frequency resources for a given time increment may be populated in an alternating pattern with data from two or more regions. For example, for a given time increment, a subset of frequency resources may be populated with control information (e.g., time-critical control information) and a different subset of frequency resources may be populated with data.

Populating symbols within an uplink slot using a frequency-first scheme may affect the timing of when symbols or regions of data are transmitted, received, or decoded. In some cases, the UE 115-a may interleave data and control information into one or more regions within the uplink slot 210 according to a frequency-first pattern. For example, time-critical control data may be interleaved in the time-critical control region 215 such that it is transmitted and received (or decoded) before other regions of the uplink slot 210 are received. For example, the time-critical control region 215 may be transmitted in an earlier portion of the uplink slot 210 and the data region 220 and the non-time-critical control region 225 may be transmitted in a later portion of the uplink slot 210. In some examples, the UE 115-a may transmit the uplink slot 210 such that an entirety of the time-critical control region 215 is transmitted before an entirety of the data region 220 and/or an entirety of the non-time-critical control region 225. Specifically, in some examples, the UE 115-a may transmit the uplink slot 210 such that the last part of the time-critical control region 215 is transmitted before the last part of the data region 220 is transmitted and the last part of the non-time-critical control region 225. This may occur even when some parts of the data region 220 or the non-time-critical control region 225 are transmitted before some parts of the time-critical control region 215 is transmitted.

Similarly, data and non-critical control information (e.g., in the data region 220 and the non-time-critical control region 225, respectively) may be interleaved into the uplink slot 210 in such a way as to control the order of their transmission and reception. In some cases, time-critical control information may be transmitted and received before data and non-time-critical control information, thereby facilitating early-decoding of the time-critical information.

The base station 105-a may signal to the UE 115-a through downlink control signaling 230 a procedure or configuration for arranging data and control information within the uplink slot 210. In this way, the base station 105-a may signal to the UE 115-a the location of the time-critical control region 215, the data region 220, and/or the non-time-critical control region 225 within the uplink slot 210. For example, the base station 105-a may indicate to the UE 115-a whether to use frequency-first mapping (e.g., frequency-first modulation) or time-first mapping (e.g., time-first modulation) for a given control region. In some cases, allocation of control information may be signaled dynamically using PDCCH, or semi-statically using RRC signaling. Additionally or alternatively, the location of control information or data within a slot may be statically configured.

In some examples, the location of a control region or a data region may be determined based on the type of control information being transmitted. For example, ACK/NACK control information or directional control information may be located at a location within the slot that is relatively close to a reference signal (e.g., DMRS).

In some cases, the time-critical control region 215 or the non-time-critical control region 225 may occupy the entire frequency span of the assigned resources of the uplink slot 210. In some other cases, both regions (time-critical control region 215 and non-time-critical control region 225) may occupy the entire frequency span of the assigned resources, which may be an example of a time division multiplexing (TDM) design. For example, the uplink slot 210 may include the time-critical control region 215, followed by the data region 220, followed by the non-time-critical control region 225. Such a scenario may facilitate reducing signaling overhead, since the control regions occupy the entire frequency span of the assigned frequency resources. In some cases, time-critical control region 215 and non-time-critical control region 225 may be independently scheduled (e.g., may be scheduled by separate scheduling grants or by separate fields within a same scheduling grant). In some cases, the data region 220 may be absent. For example, the time-critical control region 215 may comprise a first physical uplink control channel (PUCCH) for UE 115-a and the non-time-critical control region 225 may comprise a second PUCCH for UE 115-a (e.g., such that the first PUCCH and the second PUCCH may be time-division multiplexed within a given uplink slot 210).

In some other cases, the time-critical control region 215 or the non-time-critical control region 225 may alone or together occupy the entire time span of the uplink slot 210. Such a scenario may an example of a frequency division multiplexing (FDM) design.

In some examples, the uplink slot 210 may include one or more gaps between the regions and/or between the regions and the beginning and/or end of the uplink slot 210. For example, the uplink slot 210 may include a first gap between the beginning of the uplink slot 210 and the beginning of the time-critical control region 215. Additionally or alternatively, the uplink slot 210 may include a second gap between the end of the uplink slot 210 and the end of the non-time-critical control region 225. Each of these gaps may include one or more increments of time resources (e.g., one or more DFT-s-OFDM symbol periods). One or both of the gaps may be populated with data from the data region 220. Such gaps between the control regions and the ends of the uplink slot 210 may protect the control regions from switching transients in time division duplexing (TDD) operation.

Furthermore, in some cases, the frequency tones (or subcarriers) occupied by the time-critical control region 215, or the non-time-critical control region 225, or a combination thereof may be a subset of the resources allocated for uplink slot 210, while the remainder of the allocated resources may be occupied by the data region 220. In some cases, the time-critical control region 215 and non-time-critical control region 225 may be mapped to separate sides of PUSCH (e.g., with different subsets of frequency resources for time-critical control region 215 and non-time-critical control region 225). Control symbols may benefit from increased frequency diversity. In some other cases, the subsets may be different for different OFDM symbols. For example, in some cases, the total number of modulation symbols to be populated may not fit into an M×N grid, where M may signify the number of tones, and N the number of rotated symbols. In such a scenario, the control region (e.g., time-critical control region 215, non-time-critical control region 225, or a combination thereof) may have fewer tones in the last OFDM symbol of the uplink slot 210.

In some cases, frequency-first mapping may be deployed in both DFT-s-OFDM and OFDM schemes. DFT-s-OFDM may use a pilot for channel estimation (e.g., DMRS), that may span the assigned frequency resources of the uplink slot 210. In some cases, DMRS patterns with pilots distributed across time and frequency may be possible with OFDMA.

In some cases, it may be beneficial to locate time-critical control region 215 in proximity with the DMRS pilot. Furthermore, frequency-first mapping may allow time-critical control region 215 to be shifted in frequency, while maintaining a location in time closer to the DMRS pilot. In some other cases, frequency tones chosen for control (e.g., time-critical control region 215) may be chosen so as to locate control modulation symbols in proximity with DMRS symbols.

FIG. 3 illustrates an example of a wireless communications message 300 supporting channelization of uplink transmissions in accordance with aspects of the present disclosure. The wireless communications message 300 may contain an uplink slot 305, which may be an example of the uplink slot 210 described with reference to FIG. 2. The uplink slot 305 may include time and frequency resources such as one or more time increments 310 (e.g., DFT-s-OFDM symbols) and one or more frequency increments 315 (e.g., tones) and may be represented as a time-frequency grid. It should be understood that other increments of time and frequency may be used, depending on the type of slot or type of wireless system employed.

The uplink slot 305 may be divided into a separate time-critical control region 320, a data region 330, and a non-time-critical control region 325. Each region may occupy one or more frequency and time resources. The location of each region may refer to the time and frequency resources occupied by the region within the uplink slot 305. Also, the location of regions may be referred to as earlier or later depending on their respective location along the time dimension within the uplink slot 305. For example, the time-critical control region 320 may be referred to as being in an earlier portion of the uplink slot 305, and the non-time-critical control region 325 may be referred to as being in a later portion of the uplink slot 305. The data region 330 may also be referred to as being in a later portion of the uplink slot 305 with respect to the time-critical control region 320 because at least a portion of the data region 330 occupies time resources that are later in time than those occupied by the time-critical control region 320. In some cases the non-time-critical control region 325 may occupy a subset of the later portion of the uplink slot 305 and the data region 330 may occupy a remainder of the later portion of the uplink slot 305.

In accordance with aspects of the disclosure, the location of each region may be configured such that certain regions are transmitted and then received (or decoded) in a particular order, which may facilitate early decoding of some regions with respect to other regions of the uplink slot 305 or the uplink slot 305 as a whole. In some examples, a UE 115 may transmit the uplink slot 305 to a base station 105. Transmitting the uplink slot 305 may include transmitting the time-critical control region 320 in an earlier portion of the uplink slot 305 and transmitting the data region 330 and the non-time-critical control region 325 in a later portion of the uplink slot 305.

In some examples, transmitting the uplink slot 305 may include transmitting an entirety of the time-critical control region 320 before transmitting an entirety of the data region 330 and an entirety of the non-time-critical control region 325. In such examples, the last time increment 310 of the time-critical control region 320 is transmitted before the last time increment 310 of the non-time-critical control region 325 and the last time increment 310 of the data region 330 are transmitted. Even though some of the data from the data region 330 may be transmitted before the last time increment 310 of the time-critical control region 320 is transmitted, an entirety of the data region 330 is considered transmitted when the last time increment 310 of the data region 330 is transmitted.

One or more of the regions of the uplink slot 305 may be modulated frequency-first, as described above with reference to FIG. 2. In accordance with a frequency-first interleaving pattern, the frequency increments 315 within the first time increment 310 (e.g., the closest increment to the origin of the time-frequency grid) of the time-critical control region 320 may be populated with time-critical control information before the frequency increments 315 within a subsequent time increment 310 are populated with time-critical control information. A similar frequency-first interleaving pattern may also be used to populate the data region 330 and the non-time-critical control region 325. Populating the regions of uplink slot 305 according to a frequency-first pattern may allow for the time-critical control region 320 to be transmitted and received before the data region 330 and/or the non-time-critical control region 325.

Also, although the separate regions of the uplink slot 305 are shown as non-overlapping, in some examples, the one or more regions may overlap such that the time or frequency resources corresponding to the overlapping regions alternate in either a contiguous or non-contiguous manner. For example, within the time-critical control region 320, some of the frequency increments 315 may be populated with data from the data region 330. In this way, the frequency increments 315 for the time-critical control region 320 are non-contiguous, but instead alternate with frequency increments 315 populated with data. The non-contiguous population of frequency (or time) resources may also be applied to the non-time-critical control region 325.

Figure 4:
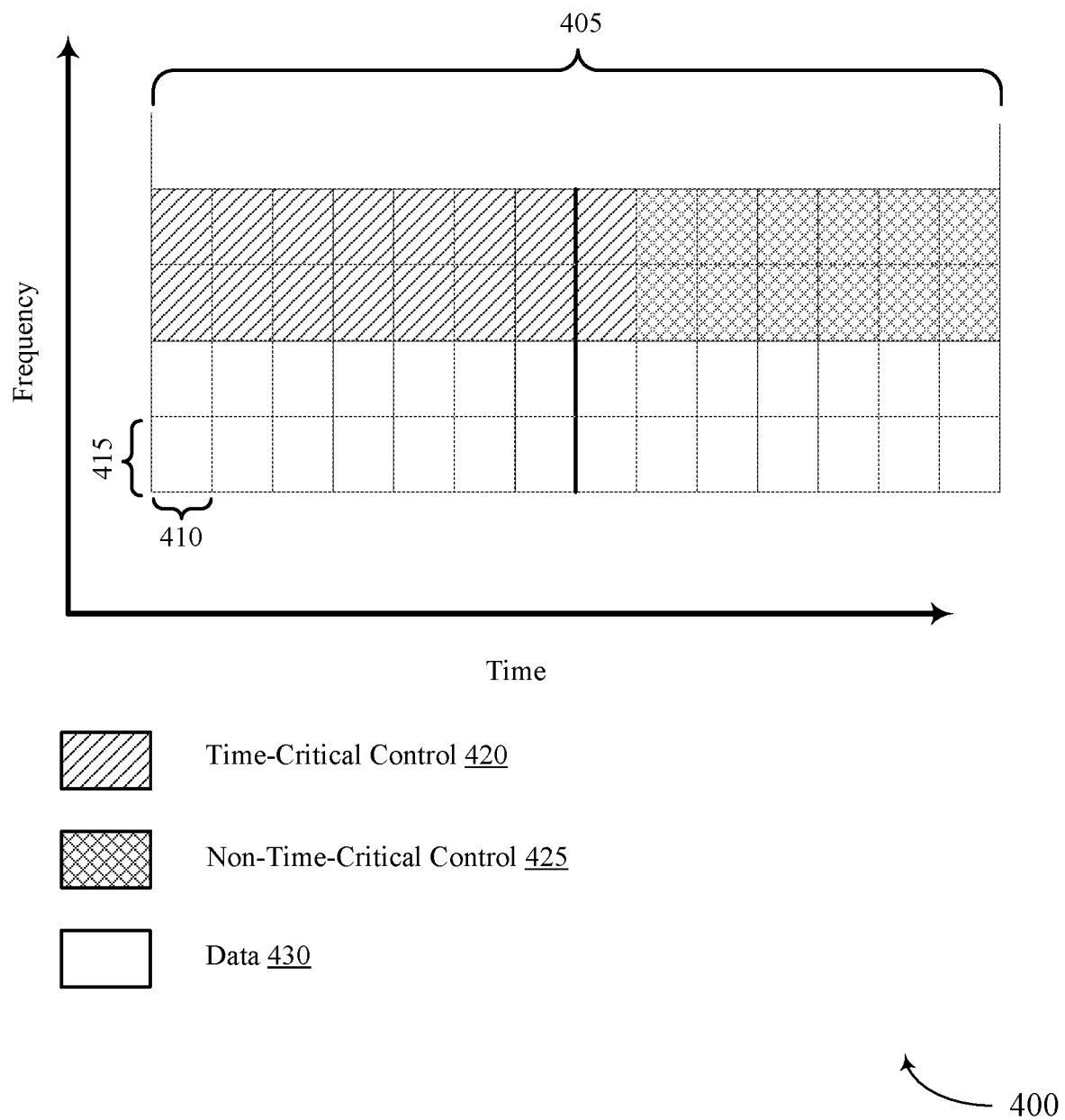
FIG. 4 illustrates an example of a wireless communications message from a device that supports channelization for uplink transmissions in accordance with aspects of the present disclosure.

FIG. 4 illustrates an example of a wireless communications message 400 supporting channelization of uplink transmissions in accordance with aspects of the present disclosure. The wireless communications message 400 may contain an uplink slot 405, which may be an example of the uplink slot 210 or 305 described with reference to FIGS. 2 and 3. The uplink slot 405 may include time and frequency resources such as one or more time increments 410 (e.g., DFT-s-OFDM symbols) and one or more frequency increments 415 (e.g., subcarriers or frequency tones) and may be represented as a time-frequency grid. It should be understood that other increments of time and frequency may be used, depending on the type of slot or type of wireless system employed.

The uplink slot 405 may be divided into a time-critical control region 420, a data region 430, and a non-time-critical control region 425. As shown, the time-critical control region 420 and the non-time-critical control region 425 together occupy the entire time span of the uplink slot 405. This configuration may be an example of an FDM design. In other cases, one or both of the time-critical control region 420 or the non-time-critical control region 425 may alone occupy the entire time span of the uplink slot 405 (located on separate frequency resources).

As discussed with reference to FIG. 3, one or more of the regions of uplink slot 405 may overlap with one or more other regions. For example, the time-critical control region 420 may at least partially overlap with the data region 430.

In accordance with aspects of the present disclosure, the location of each region may be configured such that certain regions are transmitted and then received (or decoded) in a particular order, which may facilitate early decoding of some regions with respect to other regions of the uplink slot 405 or the uplink slot 405 as a whole. For example, one or more of the regions may be modulated frequency-first, as described above with reference to FIGS. 2 and 3. Modulation symbols populated frequency-first may allow for the time-critical control region 420 to be transmitted and received before the data region 430 and/or the non-time-critical control region 425.

Figure 5:
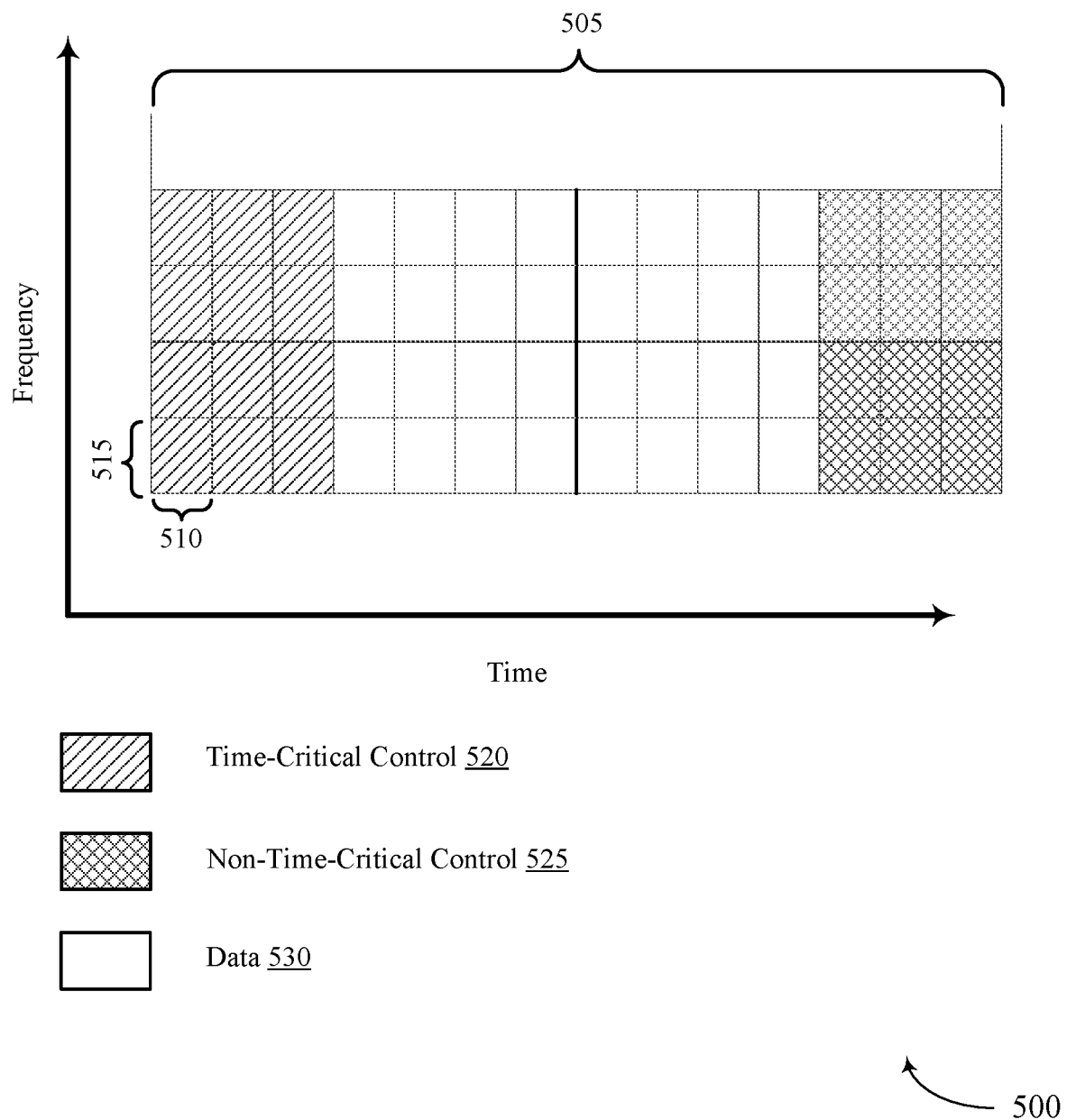
FIG. 5 illustrates an example of a wireless communications message from a device that supports channelization for uplink transmissions in accordance with aspects of the present disclosure.

FIG. 5 illustrates an example of a wireless communications message 500 supporting channelization of uplink transmissions in accordance with aspects of the present disclosure. The wireless communications message 500 may contain an uplink slot 505, which may be an example of the uplink slot 210, 305, or 405 described with reference to FIGS. 2 through 4. The uplink slot 505 may include time and frequency resources such as one or more time increments 510 (e.g., DFT-s-OFDM symbols) and one or more frequency increments 515 (e.g., subcarriers) and may be represented as a time-frequency grid. It should be understood that other increments of time and frequency may be used, depending on the type of slot or type of wireless system employed.

The uplink slot 505 may be divided into a time-critical control region 520, a data region 530, and a non-time-critical control region 525. As shown, the time-critical control region 520 and the non-time-critical control region 525 may occupy the entire frequency span of the resources assigned for uplink slot 505. This configuration may be an example of a TDM design. In some cases, one of time-critical control region 520 or the non-time-critical control region 525 may occupy the entire frequency span of the resources allocated for uplink slot 505. Such an uplink configuration may facilitate reducing signaling overhead, since the control regions occupy the entire frequency span of the resources allocated for uplink slot 505. That is, because the control regions span the allocated resources, additional signaling may not be needed to indicate a location of the control regions for wireless communications message 500.

Figure 6:
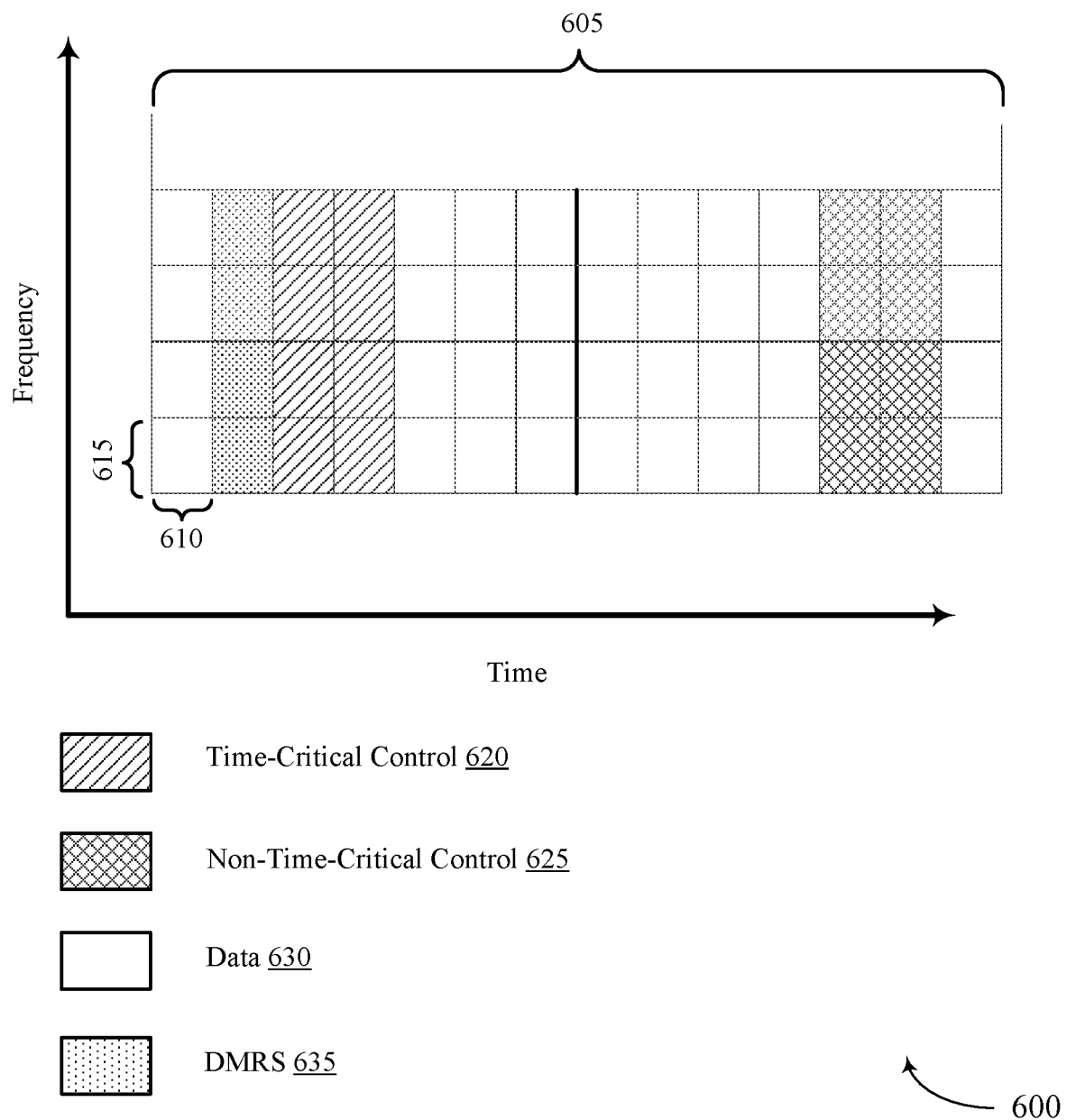
FIG. 6 illustrates an example of a wireless communications message from a device that supports channelization for uplink transmissions in accordance with aspects of the present disclosure.

FIG. 6 illustrates an example of a wireless communications message 600 supporting channelization of uplink transmissions in accordance with aspects of the present disclosure. The wireless communications message 600 may contain an uplink slot 605, which may be an example of the uplink slot 210, 305, 405, or 505 described with reference to FIGS. 2 through 5. The uplink slot 605 may include time and frequency resources such as one or more time increments 610 (e.g., DFT-s-OFDM symbols) and one or more frequency increments 615 (e.g., subcarriers) and may be represented as a time-frequency grid. It should be understood that other increments of time and frequency may be used, depending on the type of slot or type of wireless system employed.

The uplink slot 605 may be divided into a separate time-critical control region 620, a data region 630, and a non-time-critical control region 625. Each region may occupy one or more frequency and time resources. The uplink slot 605 may also include a DMRS region 635 that includes DMRS information. The DMRS region 635 may occupy one time increment 610 (e.g., one OFDM symbol) as shown or may occupy two or more time increments 610 within the uplink slot 605 (e.g., one symbol in each slot of the slot 605). Also, as shown, the DMRS region 635 may span all of the frequency resources allocated for the uplink slot 605. In some examples, the DMRS region 635 spans a subset of the frequency resources allocated for the uplink slot 605.

In some examples, the location of a region within the uplink slot 605 may be based on the location of the DMRS region 635. For example, the time-critical control region 620 may be located near (e.g., in the frequency and/or time domain) the DMRS region 635. Grouping the time-critical control region 620 near the DMRS region 635 may improve the accuracy of decoding the control information within the time-critical control region 620 because the channel properties in and around the DMRS region 635 may be accurately measured.

Furthermore, the uplink slot 605 may include at least one time increment 610 of data at the beginning of the uplink slot 605 and at the end of the uplink slot 605. These portions of the data region 630 may be referred to as a gap between the control regions and the beginning and end of the uplink slot 605.

Figure 7:
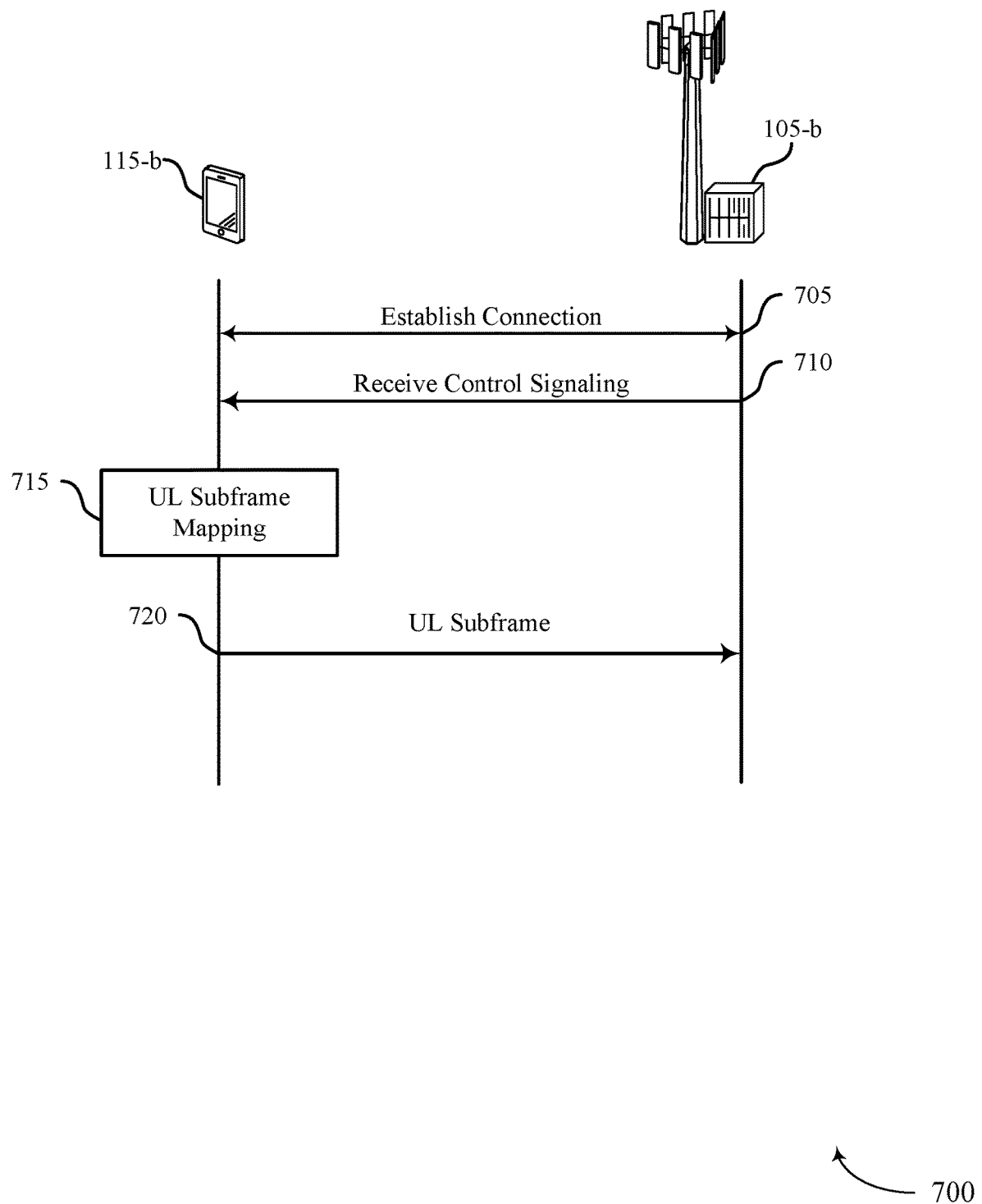
FIG. 7 shows a flow-diagram of a wireless communications system that supports channelization for uplink transmissions in accordance with aspects of the present disclosure.

FIG. 7 illustrates an example of a flow-diagram 700 between a UE 115-b and a base station 105-b supporting channelization of uplink transmissions in accordance with aspects of the present disclosure. UE 115-b and base station 105-b may be examples of the corresponding devices described above with reference to FIGS. 1 and 2.

At step 705, a wireless connection may be established between UE 115-b and base station 105-b. At step 710, the base station 105-b may transmit, and the UE 115-b may receive, control signaling. The control signaling may include PDCCH or RRC signaling. In some cases, the control signaling may indicate at least one of frequency-first modulation or time-first modulation for one or more control regions or data regions of an uplink slot. Although illustrated as separate steps, the control signaling may be transmitted during the connection setup at step 705.

At step 715, the UE 115-b may configure the uplink slot for transmission. In some cases, the UE 115-b may configure the slot based on the control signaling received at step 710 and/or during the establishment of the session at step 705. For example, the UE 115-b may populate one or more regions of the uplink slot according to a frequency-first pattern as described with reference to FIGS. 2 through 6.

At step 720, the UE 115-b may transmit, and the base station 105-b may receive, an uplink slot including a first control region and a second control region (e.g., and a data region), the first control region including first time resources and first frequency resources, the second control region including second time resources and second frequency resources, and the data region including third time resources and third frequency resources. In some cases, transmitting the uplink slot includes transmitting the first control region in an earlier portion of the uplink slot and transmitting the data region and the second control region in a later portion of the uplink slot. In some cases, transmitting the uplink slot includes transmitting an entirety of the first control region before transmitting an entirety of the data region and an entirety of the second control region.

In some cases, the first control region, the second control region, or both span every assigned frequency resource of the uplink slot. Additionally or alternatively, the first control region, or the second control region, or a combination thereof span every time resource of the uplink slot. That is, a combination of some portion (or all) of the first control region with some portion (or all) of the second control region may span every time resource of the uplink slot. In some cases, both the first control region and the second control region may span every time resource of the uplink slot (e.g., such that they occupy different frequency resources). In some such examples, the frequency resources of the first control region may be decoded before and/or with a higher reliability than the frequency resources of the second control region. The first control region may include time-critical control information, which may include an ACK, a NACK, directional communication information, a CQI, a PMI, a RI, a SI, a beam measurement, a SRS, or a combination thereof. The second control region may include non-time-critical control information, which may include an ACK, a NACK, directional communication information, a CQI, a PMI, a RI, a SI, a beam measurement, a SRS, or a combination thereof.

In some examples, the uplink slot may include a first gap between a first end of the uplink slot and a first end of the first control region, or a second gap between a second end of the uplink slot and a first end of the second control region, or both, wherein the first gap or the second gap, or both, comprise at least one time resource.

Figure 8:
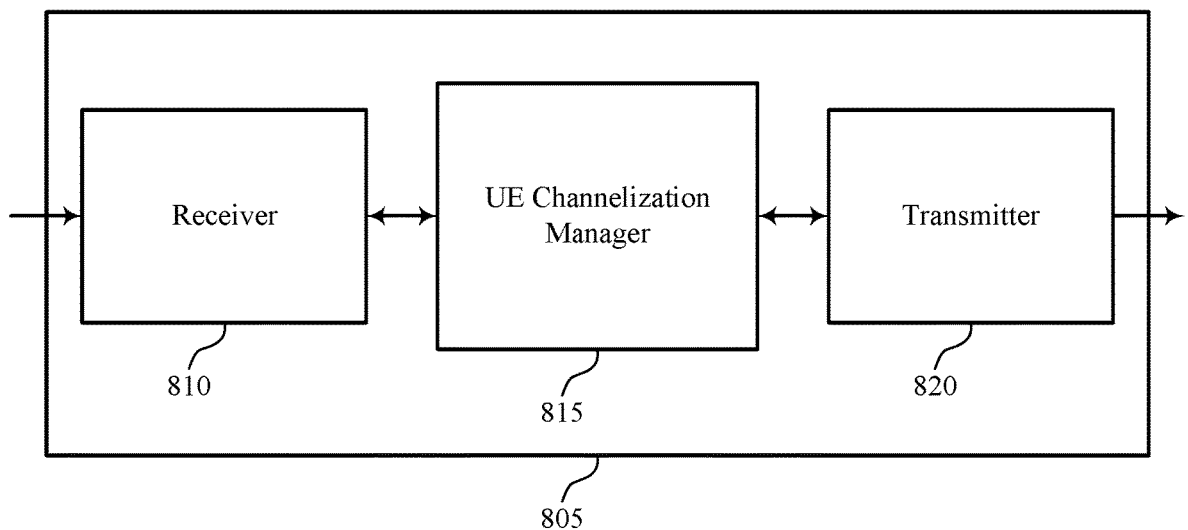
FIGS. 8 through 10 show block diagrams of a device that supports channelization for uplink transmissions in accordance with aspects of the present disclosure.

FIG. 8 shows a block diagram 800 of a wireless device 805 that supports channelization for uplink transmissions in accordance with various aspects of the present disclosure. Wireless device 805 may be an example of aspects of a UE 115 as described with reference to FIG. 1. Wireless device 805 may include receiver 810, UE channelization manager 815, and transmitter 820. Wireless device 805 may also include a processor. Each of these components may be in communication with one another (e.g., via one or more buses).

The UE channelization manager 815 and/or at least some of its various subcomponents may be implemented in hardware, software executed by a processor, firmware, or any combination thereof. If implemented in software executed by a processor, the functions of the UE channelization manager 815 and/or at least some of its various subcomponents may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE channelization manager 815 and/or at least some of its various subcomponents may be physically located at various positions, including being distributed such that portions of functions are implemented at different physical locations by one or more physical devices. In some examples, UE channelization manager 815 may be a separate and distinct component in accordance with various aspects of the present disclosure. In other examples, UE channelization manager 815 and/or at least some of its various subcomponents may be combined with one or more other hardware components, including but not limited to a receiver, a transmitter, a transceiver, one or more other components described in the present disclosure, or a combination thereof in accordance with various aspects of the present disclosure.

Receiver 810 may receive information such as packets, user data, or control information associated with various information channels (e.g., control channels, data channels, and information related to channelization for uplink transmissions, etc.). Information may be passed on to other components of the device. The receiver 810 may be an example of aspects of the transceiver 1135 described with reference to FIG. 11. Receiver 810 may receive control signaling indicating first time resources, first frequency resources, second time resources, second frequency resources, or any combination thereof.

UE channelization manager 815 may be an example of aspects of the UE channelization manager 1115 described with reference to FIG. 11. UE channelization manager 815 may transmit an uplink slot comprising a first control region and a second control region, the first control region including first time resources and first frequency resources and the second control region including second time resources and second frequency resources, wherein transmitting the uplink slot comprises transmitting the first control region in an earlier portion of the uplink slot and transmitting the second control region in a later portion of the uplink slot.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
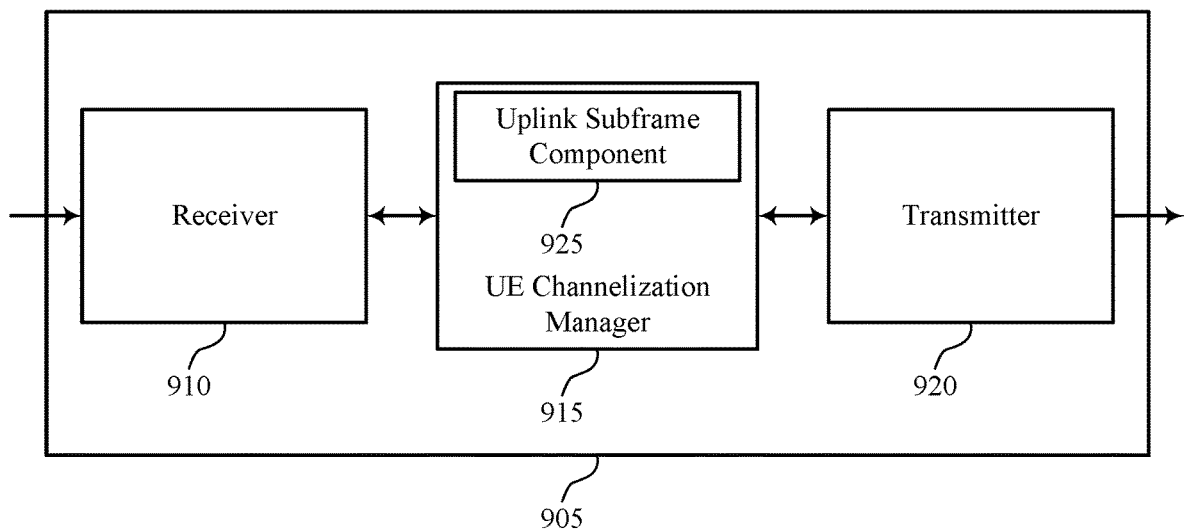

FIG. 9 shows a block diagram 900 of a wireless device 905 that supports channelization for uplink transmissions in accordance with various aspects of the present disclosure. Wireless device 905 may be an example of aspects of a wireless device 805 or a UE 115 as described with reference to FIGS. 1 and 8. Wireless device 905 may include receiver 910, UE channelization manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to channelization for uplink transmissions, etc.). Information may be passed on to other components of the device. The receiver 910 may be an example of aspects of the transceiver 1135 described with reference to FIG. 11.

UE channelization manager 915 may be an example of aspects of the UE channelization manager 815 described with reference to FIG. 8 or the UE channelization manager 1115 described with reference to FIG. 11. The UE channelization manager 915 and/or at least some of its various subcomponents may be implemented in hardware, software executed by a processor, firmware, or any combination thereof. If implemented in software executed by a processor, the functions of the UE channelization manager 915 and/or at least some of its various subcomponents may be executed by a general-purpose processor, a DSP, an ASIC, an FPGA or other programmable logic device, discrete gate or transistor logic, discrete hardware components, or any combination thereof designed to perform the functions described in the present disclosure. The UE channelization manager 915 and/or at least some of its various subcomponents may be physically located at various positions, including being distributed such that portions of functions are implemented at different physical locations by one or more physical devices. In some examples, UE channelization manager 915 may be a separate and distinct component in accordance with various aspects of the present disclosure. In other examples, UE channelization manager 915 and/or at least some of its various subcomponents may be combined with one or more other hardware components, including but not limited to a receiver, a transmitter, or a transceiver in accordance with various aspects of the present disclosure.

UE channelization manager 915 may also include uplink slot component 925. Uplink slot component 925 may transmit an uplink slot comprising a first control region and a second control region, the first control region including first time resources and first frequency resources and the second control region including second time resources and second frequency resources, wherein transmitting the uplink slot comprises transmitting the first control region in an earlier portion of the uplink slot and transmitting the second control region in a later portion of the uplink slot. In some cases, the frequency resources include frequency tones. In some cases, the later portion of the uplink slot further comprises a data region, the data region including third time resources and third frequency resources. In some cases, the first control region, the second control region, and the data region are scheduled independently from one another.

In some cases, the second control region occupies a subset of the later portion of the uplink slot and the data region occupies a remainder of the later portion of the uplink slot. In some cases, the first frequency resources, the second frequency resources, or both comprise every assigned frequency resource of the uplink slot. In some cases, the first frequency resources, the second frequency resources, or both comprise a subset of the assigned frequency resources of the uplink slot.

In some cases, the first control region, or the second control region, or a combination thereof may span every time resource of the uplink slot. In some cases, the first control region includes time-critical control information. In some cases, the time-critical control information includes a positive ACK, a NACK, directional communication information, CQI, PMI, RI, SI, SRS, a beam strength measurement, or a combination thereof. In some cases, the second control region includes non-time-critical control information. In some cases, the non-time-critical control information includes a positive ACK, a NACK, directional communication information, CQI, PMI, RI, SI, SRS, a beam strength measurement, or a combination thereof.

In some cases, transmitting the uplink slot further includes transmitting an entirety of the first control region before transmitting an entirety of the data region and an entirety of the second control region. In some cases, the control signaling includes PDCCH signaling or RRC signaling. In some cases, a location of the first control region within the uplink slot is based on a type of control information in the first control region. In some cases, a location of the first control region within the uplink slot is based on a location of one or more DMRS within the uplink slot.

In some cases, the uplink slot includes a first gap between a first end of the uplink slot and a first end of the first control region, or a second gap between a second end of the uplink slot and a first end of the second control region, or both, where the first gap or the second gap, or both, includes at least one time resource. In some cases, the time resources include OFDM symbols or DFT-s-OFDM symbols. In some cases, the control signaling indicates at least one of frequency-first modulation or time-first modulation for the first control region, the second control region, or the data region.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
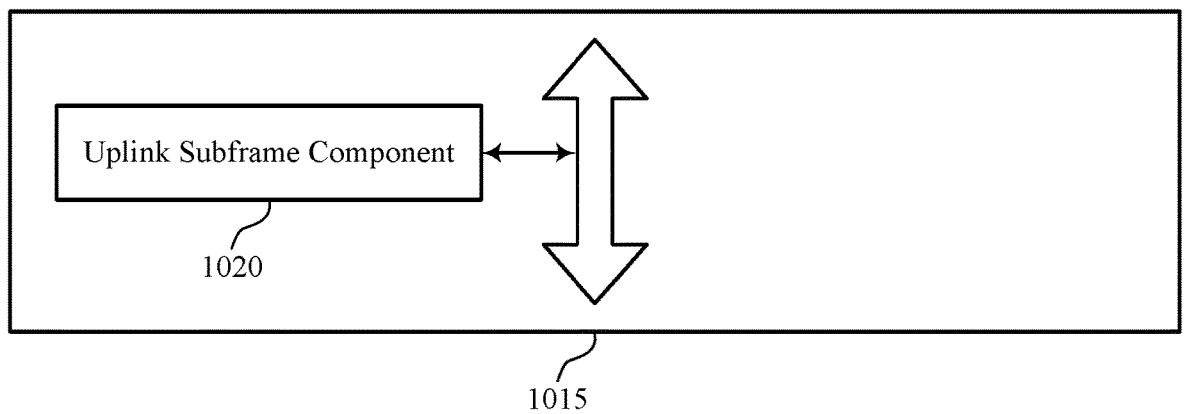

FIG. 10 shows a block diagram 1000 of a UE channelization manager 1015 that supports channelization for uplink transmissions in accordance with various aspects of the present disclosure. The UE channelization manager 1015 may be an example of aspects of a UE channelization manager 815, a UE channelization manager 915, or a UE channelization manager 1115 described with reference to FIGS. 8, 9, and 11, respectively. The UE channelization manager 1015 may include uplink slot component 1020. This module may communicate, directly or indirectly, with one other components of the wireless device (e.g., via one or more buses).

Uplink slot component 1020 may transmit an uplink slot comprising a first control region and a second control region, the first control region including first time resources and first frequency resources and the second control region including second time resources and second frequency resources, wherein transmitting the uplink slot comprises transmitting the first control region in an earlier portion of the uplink slot and transmitting the second control region in a later portion of the uplink slot. In some cases, the frequency resources include frequency tones. In some cases, the later portion of the uplink slot further comprises a data region, the data region including third time resources and third frequency resources. In some cases, the first control region, the second control region, and the data region are scheduled independently from one another.

In some cases, the second control region occupies a subset of the later portion of the uplink slot and the data region occupies a remainder of the later portion of the uplink slot. In some cases, the first frequency resources, the second frequency resources, or both comprise every assigned frequency resource of the uplink slot. In some cases, the first frequency resources, the second frequency resources, or both comprise a subset of the assigned frequency resources of the uplink slot.

In some cases, the first control region, or the second control region, or a combination thereof may span every time resource of the uplink slot. In some cases, the first control region includes time-critical control information. In some cases, the time-critical control information includes a positive ACK, a NACK, directional communication information, CQI, PMI, RI, SI, SRS, a beam strength measurement, or a combination thereof. In some cases, the second control region includes non-time-critical control information. In some cases, the non-time-critical control information includes a positive ACK, a NACK, directional communication information, CQI, PMI, RI, SI, SRS, a beam strength measurement, or a combination thereof.

In some cases, transmitting the uplink slot further includes transmitting an entirety of the first control region before transmitting an entirety of the data region and an entirety of the second control region. In some cases, the control signaling includes PDCCH signaling or RRC signaling. In some cases, a location of the first control region within the uplink slot is based on a type of control information in the first control region. In some cases, a location of the first control region within the uplink slot is based on a location of one or more DMRS within the uplink slot.

In some cases, the uplink slot includes a first gap between a first end of the uplink slot and a first end of the first control region, or a second gap between a second end of the uplink slot and a first end of the second control region, or both, where the first gap or the second gap, or both, includes at least one time resource. In some cases, the time resources include OFDM symbols or DFT-s-OFDM symbols. In some cases, the control signaling indicates at least one of frequency-first modulation or time-first modulation for the first control region, the second control region, or the data region.

Figure 11:
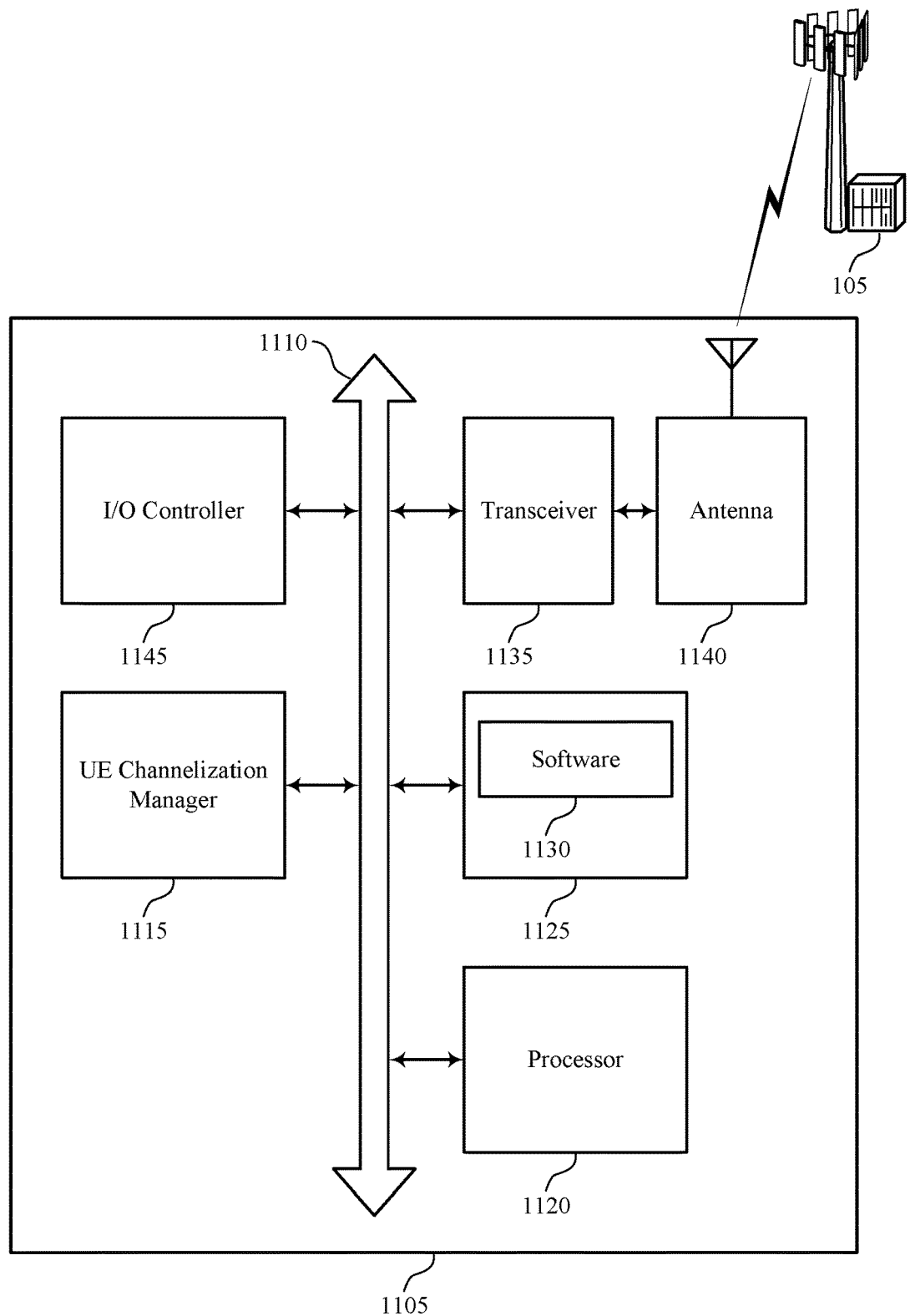
FIG. 11 illustrates a block diagram of a system including a UE that supports channelization for uplink transmissions in accordance with aspects of the present disclosure.

FIG. 11 shows a diagram of a system 1100 including a device 1105 that supports channelization for uplink transmissions in accordance with various aspects of the present disclosure. Device 1105 may be an example of or includes the components of wireless device 805, wireless device 905, or a UE 115 as described above, e.g., with reference to FIGS. 1, 8 and 9. Device 1105 may include components for bi-directional voice and data communications including components for transmitting and receiving communications, including UE channelization manager 1115, processor 1120, memory 1125, software 1130, transceiver 1135, antenna 1140, and I/O controller 1145. These components may communicate electronically via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, a FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in memory 1125 to perform various functions (e.g., functions or tasks supporting channelization for uplink transmissions).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support channelization for uplink transmissions. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas 1140, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system.

Figure 12:
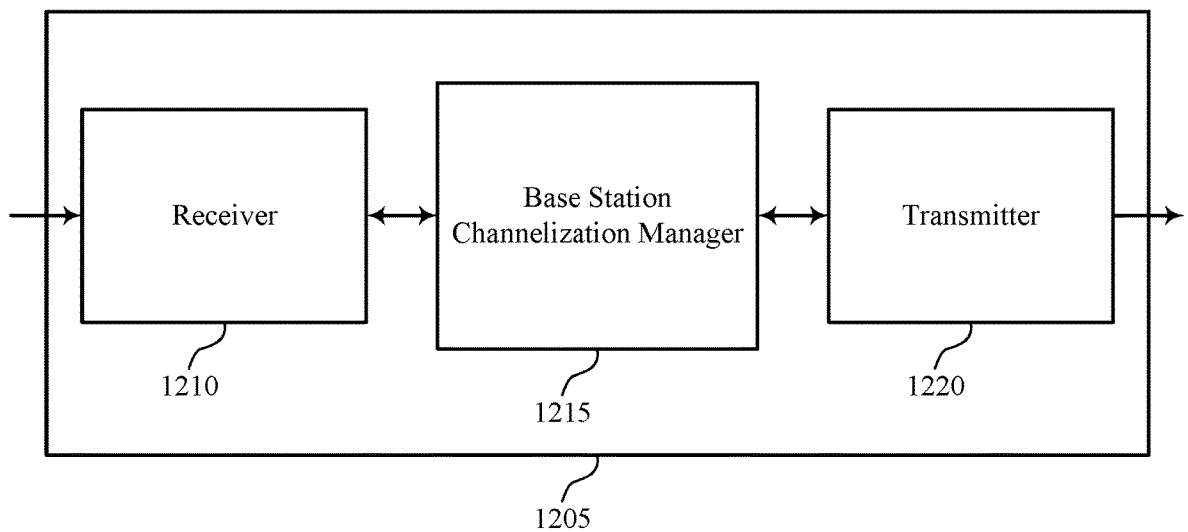
FIGS. 12 through 14 show block diagrams of a device that supports channelization for uplink transmissions in accordance with aspects of the present disclosure.

FIG. 12 shows a block diagram 1200 of a wireless device 1205 that supports channelization for uplink transmissions in accordance with various aspects of the present disclosure. Wireless device 1205 may be an example of aspects of a base station 105 as described with reference to FIG. 1. Wireless device 1205 may include receiver 1210, base station channelization manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to channelization for uplink transmissions, etc.). Information may be passed on to other components of the device. The receiver 1210 may be an example of aspects of the transceiver 1535 described with reference to FIG. 15. The base station channelization manager 1215 and/or at least some of its various subcomponents may be implemented in hardware, software executed by a processor, firmware, or any combination thereof. If implemented in software executed by a processor, the functions of the base station channelization manager 1215 and/or at least some of its various subcomponents may be executed by a general-purpose processor, a DSP, an ASIC, an FPGA or other programmable logic device, discrete gate or transistor logic, discrete hardware components, or any combination thereof designed to perform the functions described in the present disclosure. The base station channelization manager 1215 and/or at least some of its various subcomponents may be physically located at various positions, including being distributed such that portions of functions are implemented at different physical locations by one or more physical devices. In some examples, base station channelization manager 1215 may be a separate and distinct component in accordance with various aspects of the present disclosure. In other examples, base station channelization manager 1215 and/or at least some of its various subcomponents may be combined with one or more other hardware components, including but not limited to a receiver, a transmitter, or a transceiver in accordance with various aspects of the present disclosure.

Base station channelization manager 1215 may be an example of aspects of the base station channelization manager 1515 described with reference to FIG. 15. Base station channelization manager 1215 may receive an uplink slot comprising a first control region and a second control region, the first control region including first time resources and first frequency resources and the second control region including second time resources and second frequency resources, wherein receiving the uplink slot comprises receiving the first control region in an earlier portion of the uplink slot and receiving the second control region in a later portion of the uplink slot.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas. Transmitter 1220 may transmit control signaling indicating first time resources, first frequency resources, second time resources, second frequency resources, or any combination thereof.

Figure 13:
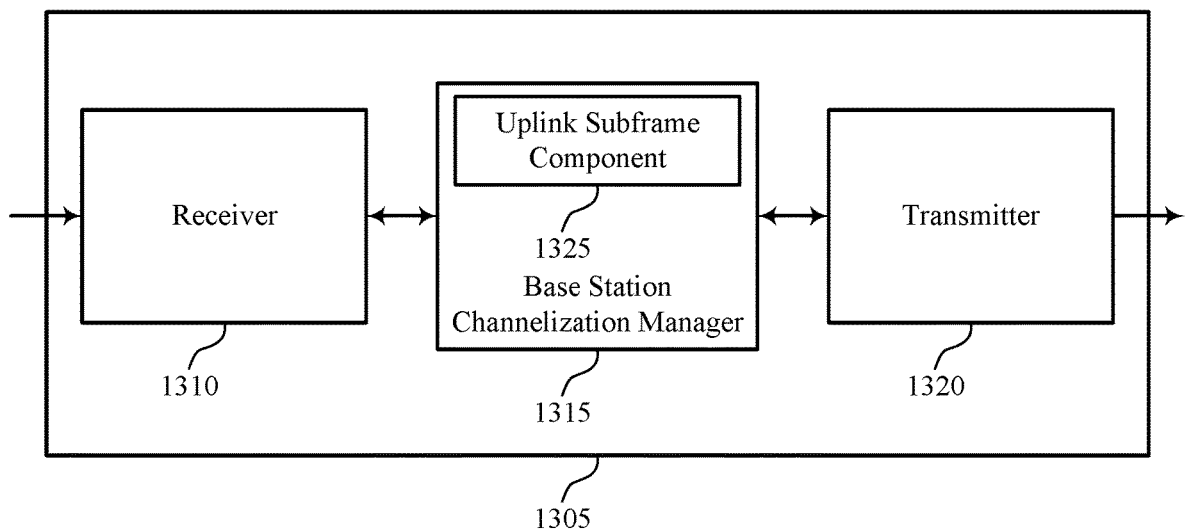

FIG. 13 shows a block diagram 1300 of a wireless device 1305 that supports channelization for uplink transmissions in accordance with various aspects of the present disclosure. Wireless device 1305 may be an example of aspects of a wireless device 1205 or a base station 105 as described with reference to FIGS. 1 and 12. Wireless device 1305 may include receiver 1310, base station channelization manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to channelization for uplink transmissions, etc.). Information may be passed on to other components of the device. The receiver 1310 may be an example of aspects of the transceiver 1535 described with reference to FIG. 15.

Base station channelization manager 1315 may be an example of aspects of the base station channelization manager 1515 described with reference to FIG. 15. Base station channelization manager 1315 may also include an uplink slot component 1325.

Uplink slot component 1325 may receive an uplink slot comprising a first control region and a second control region, the first control region including first time resources and first frequency resources and the second control region including second time resources and second frequency resources, wherein receiving the uplink slot comprises receiving the first control region in an earlier portion of the uplink slot and receiving the second control region in a later portion of the uplink slot. In some cases, the frequency resources include frequency tones. In some cases, the later portion of the uplink slot further comprises a data region, the data region including third time resources and third frequency resources. In some cases, the first control region, the second control region, and the data region are scheduled independently from one another.

In some cases, the second control region occupies a subset of the later portion of the uplink slot and the data region occupies a remainder of the later portion of the uplink slot. In some cases, the first frequency resources, the second frequency resources, or both comprise every assigned frequency resource of the uplink slot. In some cases, the first frequency resources, the second frequency resources, or both comprise a subset of the assigned frequency resources of the uplink slot.

In some cases, the first control region, or the second control region, or a combination thereof may span every time resource of the uplink slot. In some cases, the first control region includes time-critical control information. In some cases, the time-critical control information includes a positive ACK, a NACK, directional communication information, CQI, PMI, RI, SI, SRS, a beam strength measurement, or a combination thereof. In some cases, the second control region includes non-time-critical control information. In some cases, the non-time-critical control information includes a positive ACK, a NACK, directional communication information, CQI, PMI, RI, SI, SRS, a beam strength measurement, or a combination thereof.

In some cases, transmitting the uplink slot further includes transmitting an entirety of the first control region before transmitting an entirety of the data region and an entirety of the second control region. In some cases, the control signaling includes PDCCH signaling or RRC signaling. In some cases, a location of the first control region within the uplink slot is based on a type of control information in the first control region. In some cases, a location of the first control region within the uplink slot is based on a location of one or more DMRS within the uplink slot.

In some cases, the uplink slot includes a first gap between a first end of the uplink slot and a first end of the first control region, or a second gap between a second end of the uplink slot and a first end of the second control region, or both, where the first gap or the second gap, or both, includes at least one time resource. In some cases, the time resources include OFDM symbols or DFT-s-OFDM symbols. In some cases, the control signaling indicates at least one of frequency-first modulation or time-first modulation for the first control region, the second control region, or the data region.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
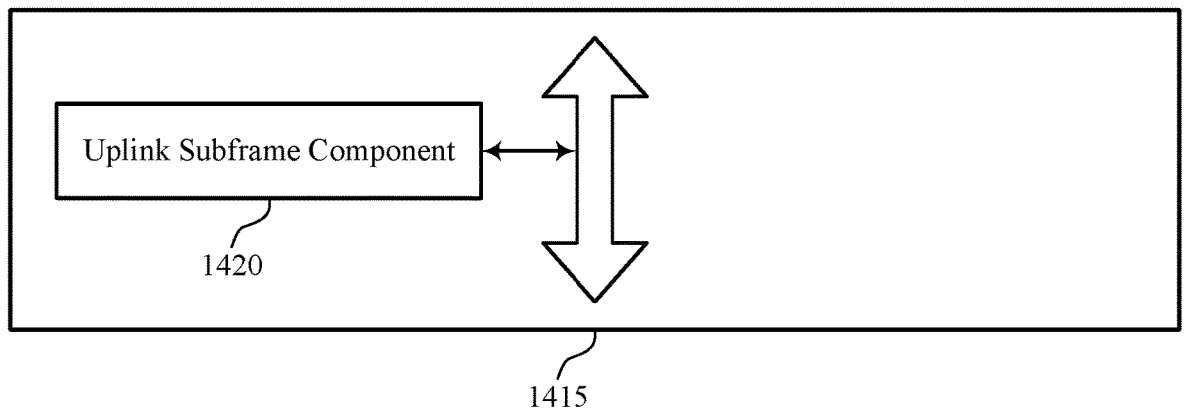

FIG. 14 shows a block diagram 1400 of a base station channelization manager 1415 that supports channelization for uplink transmissions in accordance with various aspects of the present disclosure. The base station channelization manager 1415 may be an example of aspects of a base station channelization manager 1215, a base station channelization manager 1315, or a base station channelization manager 1515 described with reference to FIGS. 12, 13, and 15. The base station channelization manager 1415 may include uplink slot component 1420. This module may communicate, directly or indirectly, with one or more other components of the wireless device (e.g., via one or more buses).

Uplink slot component 1420 may receive an uplink slot comprising a first control region and a second control region, the first control region including first time resources and first frequency resources and the second control region including second time resources and second frequency resources, wherein receiving the uplink slot comprises receiving the first control region in an earlier portion of the uplink slot and receiving the second control region in a later portion of the uplink slot. In some cases, the frequency resources include frequency tones. In some cases, the later portion of the uplink slot further comprises a data region, the data region including third time resources and third frequency resources. In some cases, the first control region, the second control region, and the data region are scheduled independently from one another.

In some cases, the second control region occupies a subset of the later portion of the uplink slot and the data region occupies a remainder of the later portion of the uplink slot. In some cases, the first frequency resources, the second frequency resources, or both comprise every assigned frequency resource of the uplink slot. In some cases, the first frequency resources, the second frequency resources, or both comprise a subset of the assigned frequency resources of the uplink slot.

In some cases, the first control region, or the second control region, or a combination thereof may span every time resource of the uplink slot. In some cases, the first control region includes time-critical control information. In some cases, the time-critical control information includes a positive ACK, a NACK, directional communication information, CQI, PMI, RI, SI, SRS, a beam strength measurement, or a combination thereof. In some cases, the second control region includes non-time-critical control information. In some cases, the non-time-critical control information includes a positive ACK, a NACK, directional communication information, CQI, PMI, RI, SI, SRS, a beam strength measurement, or a combination thereof.

In some cases, receiving the uplink slot further includes receiving an entirety of the first control region before receiving an entirety of the data region and an entirety of the second control region. In some cases, the control signaling includes PDCCH signaling or RRC signaling. In some cases, a location of the first control region within the uplink slot is based on a type of control information in the first control region. In some cases, a location of the first control region within the uplink slot is based on a location of one or more DMRS within the uplink slot.

In some cases, the uplink slot includes a first gap between a first end of the uplink slot and a first end of the first control region, or a second gap between a second end of the uplink slot and a first end of the second control region, or both, where the first gap or the second gap, or both, includes at least one time resource. In some cases, the time resources include OFDM symbols or DFT-s-OFDM symbols. In some cases, the control signaling indicates at least one of frequency-first modulation or time-first modulation for the first control region, the second control region, or the data region.

Figure 15:
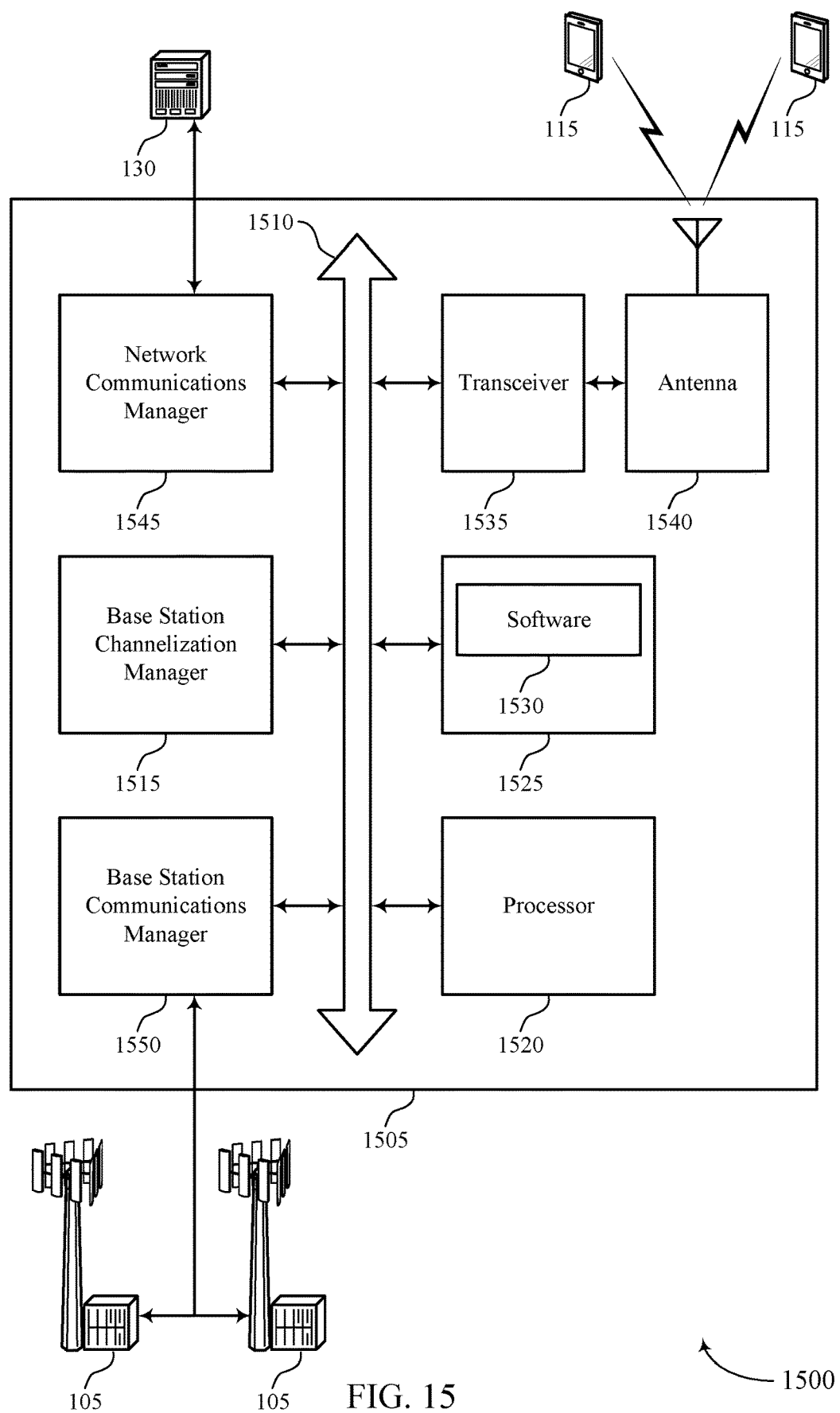
FIG. 15 illustrates a block diagram of a system including a base station that supports channelization for uplink transmissions in accordance with aspects of the present disclosure.

FIG. 15 shows a diagram of a system 1500 including a device 1505 that supports channelization for uplink transmissions in accordance with various aspects of the present disclosure. Device 1505 may be an example of or include the components of base station 105 as described above, e.g., with reference to FIG. 1. Device 1505 may include components for bi-directional voice and data communications including components for transmitting and receiving communications, including base station channelization manager 1515, processor 1520, memory 1525, software 1530, transceiver 1535, antenna 1540, network communications manager 1545, and base station communications manager 1550. These components may communicate electronically via one or more buses (e.g., bus 1510). Device 1505 may communicate wirelessly with one or more UEs 115.

The base station channelization manager 1515 may be implemented in hardware, software executed by a processor, firmware, or any combination thereof. If implemented in software executed by a processor, the functions of the base station channelization manager 1515 may be executed by a general-purpose processor, a DSP, an ASIC, an FPGA or other programmable logic device, discrete gate or transistor logic, discrete hardware components, or any combination thereof designed to perform the functions described in the present disclosure. The base station channelization manager 1515 may be physically located at various positions, including being distributed such that portions of functions are implemented at different physical locations by one or more physical devices. In some examples, base station channelization manager 1515 may be a separate and distinct component in accordance with various aspects of the present disclosure. In other examples, base station channelization manager 1515 may be combined with one or more other hardware components, including but not limited to a receiver, a transmitter, or a transceiver in accordance with various aspects of the present disclosure.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting channelization for uplink transmissions).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support channelization for uplink transmissions. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network 130 (e.g., via one or more wired backhaul links). For example, the network communications manager 1545 may manage the transfer of data communications for client devices, such as one or more UEs 115.

Base station communications manager 1550 may manage communications with base stations 105, and may include a controller or scheduler for controlling communications with UEs 115 in cooperation with other base stations 105. For example, the base station communications manager 1550 may coordinate scheduling for transmissions to UEs 115 for various interference mitigation techniques such as beamforming or joint transmission. In some examples, base station communications manager 1550 may provide a X2 interface within a LTE/LTE-A wireless communication network to provide communication between base stations 105.

The network communications manager 1545 and the base station communications manager 1550 may be implemented in hardware, software executed by a processor, firmware, or any combination thereof. If implemented in software executed by a processor, the functions of the network communications manager 1545 and the base station communications manager 1550 may be executed by a general-purpose processor, a controller, a DSP, an ASIC, an FPGA or other programmable logic device, discrete gate or transistor logic, discrete hardware components, or any combination thereof designed to perform the functions described in the present disclosure. The network communications manager 1545 and the base station communications manager 1550 may be physically located at various positions, including being distributed such that portions of functions are implemented at different physical locations by one or more physical devices. In some examples, network communications manager 1545 and the base station communications manager 1550 may be a separate and distinct component in accordance with various aspects of the present disclosure. In other examples, each of the network communications manager 1545 and the base station communications manager 1550 may be combined with one or more other hardware components, including but not limited to a receiver, a transmitter, or a transceiver in accordance with various aspects of the present disclosure.

FIG. 16 shows a flowchart illustrating a method 1600 for channelization for uplink transmissions in accordance with various aspects of the present disclosure. The operations of method 1600 may be implemented by a UE 115 or its components as described herein. For example, the operations of method 1600 may be performed by a UE channelization manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may transmit an uplink slot comprising a first control region and a second control region, the first control region including first time resources and first frequency resources and the second control region including second time resources and second frequency resources, wherein transmitting the uplink slot comprises transmitting the first control region in an earlier portion of the uplink slot and transmitting the second control region in a later portion of the uplink slot. The operations of block 1605 may be performed according to the methods described with reference to FIGS. 1 through 7. In certain examples, aspects of the operations of block 1605 may be performed by an uplink slot component as described with reference to FIGS. 8 through 11.

Figure 17:
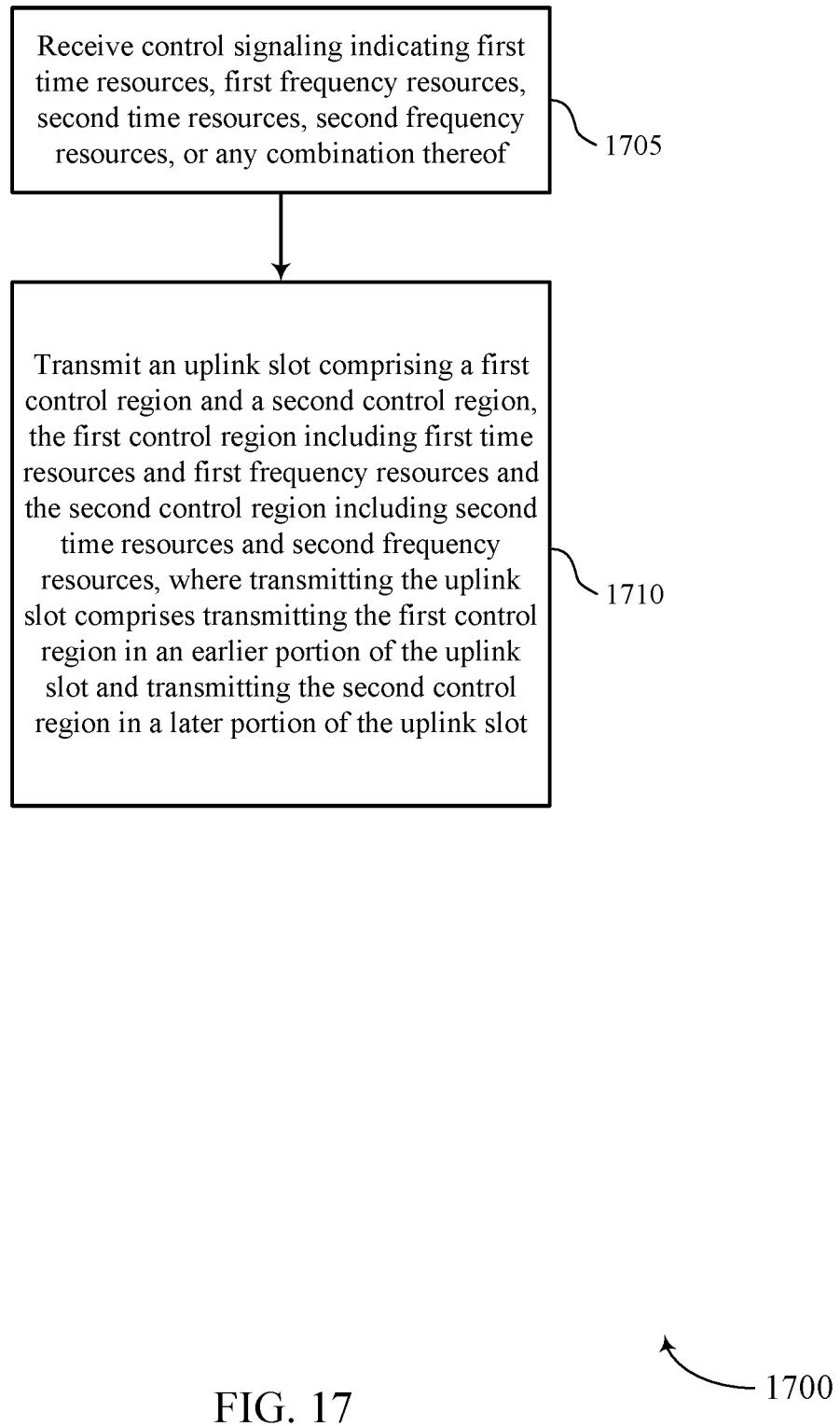

FIG. 17 shows a flowchart illustrating a method 1700 for channelization for uplink transmissions in accordance with various aspects of the present disclosure. The operations of method 1700 may be implemented by a UE 115 or its components as described herein. For example, the operations of method 1700 may be performed by a UE channelization manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive control signaling indicating first time resources, first frequency resources, second time resources, second frequency resources, or any combination thereof. The operations of block 1705 may be performed according to the methods described with reference to FIGS. 1 through 7. In certain examples, aspects of the operations of block 1705 may be performed by a receiver as described with reference to FIGS. 8 through 11.

At block 1710 the UE 115 may transmit an uplink slot comprising a first control region and a second control region, the first control region including first time resources and first frequency resources and the second control region including second time resources and second frequency resources, wherein transmitting the uplink slot comprises transmitting the first control region in an earlier portion of the uplink slot and transmitting the second control region in a later portion of the uplink slot. The operations of block 1710 may be performed according to the methods described with reference to FIGS. 1 through 7. In certain examples, aspects of the operations of block 1710 may be performed by a uplink slot component as described with reference to FIGS. 8 through 11.

FIG. 18 shows a flowchart illustrating a method 1800 for channelization for uplink transmissions in accordance with various aspects of the present disclosure. The operations of method 1800 may be implemented by a base station 105 or its components as described herein. For example, the operations of method 1800 may be performed by a base station channelization manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may receive an uplink slot comprising a first control region and a second control region, the first control region including first time resources and first frequency resources and the second control region including second time resources and second frequency resources, wherein receiving the uplink slot comprises receiving the first control region in an earlier portion of the uplink slot and receiving the second control region in a later portion of the uplink slot. The operations of block 1805 may be performed according to the methods described with reference to FIGS. 1 through 7. In certain examples, aspects of the operations of block 1805 may be performed by a uplink slot component as described with reference to FIGS. 12 through 15.

Figure 19:
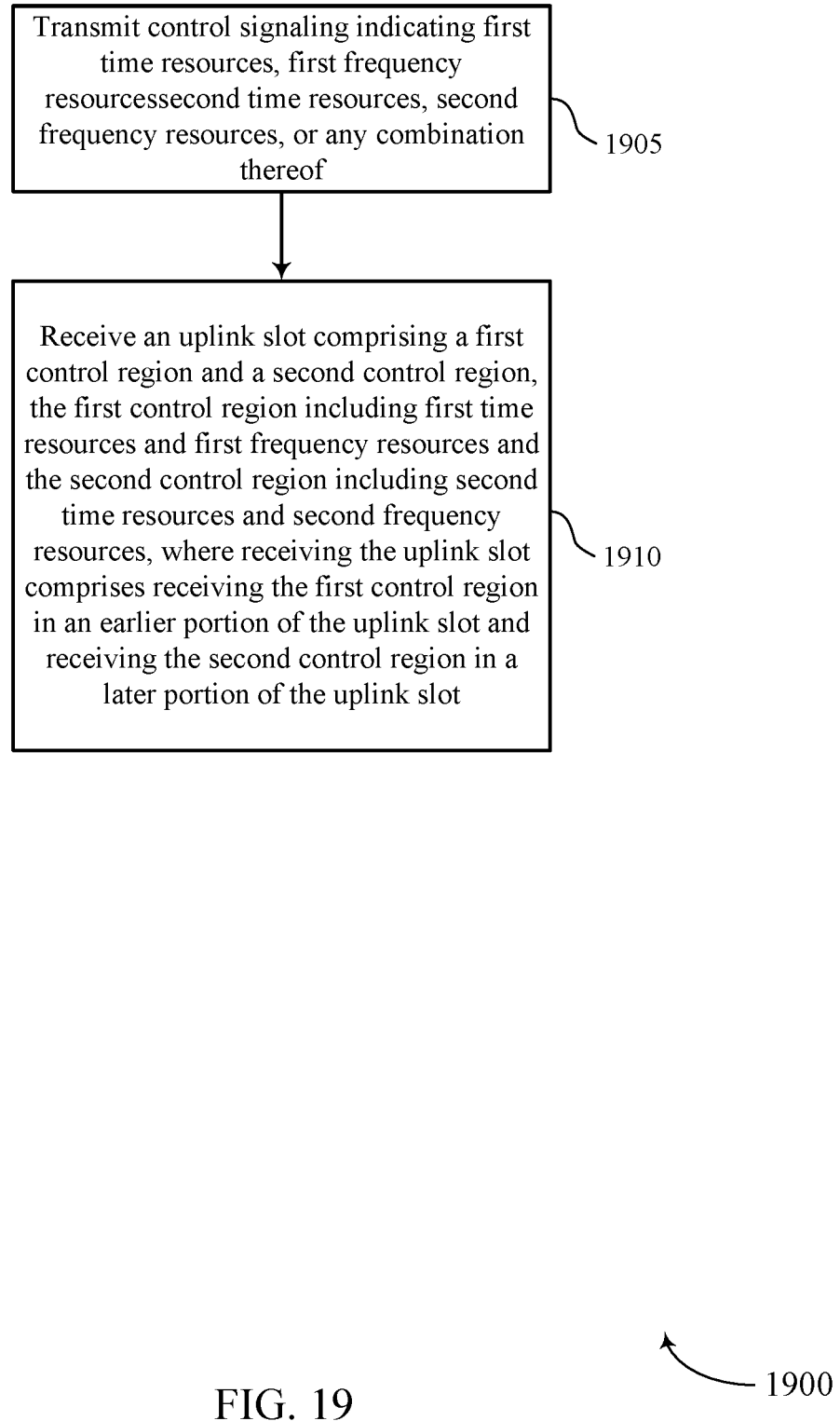

FIG. 19 shows a flowchart illustrating a method 1900 for channelization for uplink transmissions in accordance with various aspects of the present disclosure. The operations of method 1900 may be implemented by a base station 105 or its components as described herein. For example, the operations of method 1900 may be performed by a base station channelization manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may transmit control signaling indicating first time resources, first frequency resources, second time resources, second frequency resources, or any combination thereof. The operations of block 1905 may be performed according to the methods described with reference to FIGS. 1 through 7. In certain examples, aspects of the operations of block 1905 may be performed by a transmitter as described with reference to FIGS. 12 through 15.

At block 1910 the base station 105 may receive an uplink slot comprising a first control region and a second control region, the first control region including first time resources and first frequency resources and the second control region including second time resources and second frequency resources, wherein receiving the uplink slot comprises receiving the first control region in an earlier portion of the uplink slot and receiving the second control region in a later portion of the uplink slot. The operations of block 1910 may be performed according to the methods described with reference to FIGS. 1 through 7. In certain examples, aspects of the operations of block 1910 may be performed by a uplink slot component as described with reference to FIGS. 12 through 15.

It should be noted that the methods described above describe possible implementations, and that the operations and the steps may be rearranged or otherwise modified and that other implementations are possible. Furthermore, aspects from two or more of the methods 1600, 1700, 1800, and 1900 described with reference to FIGS. 16, 17, 18, and 19 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, a combination of licensed and unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, a gNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   populating symbols within an uplink slot based at least in part on a frequency-first modulation scheme; and
   transmitting the uplink slot based at least in part on populating the symbols, the uplink slot comprising a first control region and a second control region, the first control region including first time resources and first frequency resources, and the second control region including second time resources and second frequency resources, wherein:
   the first control region is transmitted in an earlier portion of the uplink slot than the second control region;
   the second control region is transmitted in a later portion of the uplink slot than the first control region;
   the first control region, or the second control region, or a combination thereof span every time resource of the uplink slot; and
   a last portion of the first control region is transmitted before a last portion of the second control region.

2. The method of claim 1, wherein the uplink slot further comprises a data region, the data region including third time resources and third frequency resources.

3. The method of claim 2, wherein the data region at least partially overlaps in frequency with the first control region or the second control region.

4. The method of claim 2, wherein the data region spans every time resource of the uplink slot.

5. The method of claim 1, wherein the first frequency resources and the second frequency resources do not overlap.

6. The method of claim 1, wherein the first frequency resources, the second frequency resources, or both, comprise a subset of assigned frequency resources of the uplink slot.

7. The method of claim 1, wherein the first control region comprises time-critical control information and the second control region comprises non-time-critical control information.

8. The method of claim 7, wherein the time-critical control information comprises acknowledgement information.

9. The method of claim 7, wherein the non-time-critical control information comprises directional communication information, a channel quality indication (CQI), a precoding matrix indicator (PMI), a rank indicator (RI), a scheduling information indicator (SI), a sounding reference signal (SRS), a beam strength measurement, or a combination thereof.

10. The method of claim 1, wherein the first control region and the second control region are scheduled independently from one another by separate scheduling grants.

11. The method of claim 1, wherein the first control region and the second control region are scheduled independently from one another by separate portions of a scheduling grant.

12. A method for wireless communication, comprising:
receiving an uplink slot comprising a first control region and a second control region, the first control region including first time resources and first frequency resources, and the second control region including second time resources and second frequency resources, wherein:
symbols within the uplink slot are received based at least in part on a frequency-first modulation scheme;
the first control region is received in an earlier portion of the uplink slot than the second control region;
the second control region is received in a later portion of the uplink slot than the first control region;
the first control region, or the second control region, or a combination thereof span every time resource of the uplink slot; and
a last portion of the first control region is received before a last portion of the second control region.

13. The method of claim 12, wherein the uplink slot further comprises a data region, the data region including third time resources and third frequency resources.

14. The method of claim 13, wherein the data region at least partially overlaps in frequency with the first control region or the second control region.

15. The method of claim 13, wherein the data region spans every time resource of the uplink slot.

16. The method of claim 12, wherein the first frequency resources and the second frequency resources do not overlap.

17. The method of claim 12, wherein the first frequency resources, the second frequency resources, or both, comprise a subset of assigned frequency resources of the uplink slot.

18. The method of claim 12, wherein the first control region comprises time-critical control information and the second control region comprises non-time-critical control information.

19. The method of claim 18, wherein the time-critical control information comprises acknowledgement information.

20. The method of claim 18, wherein the non-time-critical control information comprises directional communication information, a channel quality indication (CQI), a precoding matrix indicator (PMI), a rank indicator (RI), a scheduling information indicator (SI), a sounding reference signal (SRS), a beam strength measurement, or a combination thereof.

21. An apparatus for wireless communication, in a system comprising:
a processor;
memory in electronic communication with the processor; and
instructions stored in the memory and operable, when executed by the processor, to cause the apparatus to:
populate symbols within an uplink slot based at least in part on a frequency-first modulation scheme; and
transmit the uplink slot based at least in part on populating the symbols, the uplink slot comprising a first control region and a second control region, the first control region including first time resources and first frequency resources, and the second control region including second time resources and second frequency resources, wherein:
the first control region is transmitted in an earlier portion of the uplink slot than the second control region;
the second control region is transmitted in a later portion of the uplink slot than the first control region;
the first control region, or the second control region, or a combination thereof span every time resource of the uplink slot; and
a last portion of the first control region is transmitted before a last portion of the second control region.

22. The apparatus of claim 21, wherein the uplink slot further comprises a data region, the data region including third time resources and third frequency resources.

23. The apparatus of claim 22, wherein the data region at least partially overlaps in frequency with the first control region or the second control region.

24. An apparatus for wireless communication, in a system comprising:
a processor;
memory in electronic communication with the processor; and
instructions stored in the memory and operable, when executed by the processor, to cause the apparatus to:
receive an uplink slot comprising a first control region and a second control region, the first control region including first time resources and first frequency resources, and the second control region including second time resources and second frequency resources, wherein:
symbols within the uplink slot are received based at least in part on a frequency-first modulation scheme;
the first control region is received in an earlier portion of the uplink slot than the second control region;
the second control region is received in a later portion of the uplink slot than the first control region;
the first control region, or the second control region, or a combination thereof span every time resource of the uplink slot; and
a last portion of the first control region is received before a last portion of the second control region.

25. The apparatus of claim 24, wherein the uplink slot further comprises a data region, the data region including third time resources and third frequency resources.

26. The apparatus of claim 25, wherein the data region at least partially overlaps in frequency with the first control region or the second control region.

\* \* \* \* \*